United States Patent
Wu et al.

(10) Patent No.: US 12,218,759 B2
(45) Date of Patent: Feb. 4, 2025

(54) ELECTRONIC DEVICE, COMMUNICATION METHOD AND STORAGE MEDIUM

(71) Applicant: Sony Group Corporation, Tokyo (JP)

(72) Inventors: Zhikun Wu, Beijing (CN); Chen Sun, Beijing (CN)

(73) Assignee: SONY GROUP CORPORATION, Tokyo (JP)

(*) Notice: Subject to any disclaimer, the term of this patent is extended or adjusted under 35 U.S.C. 154(b) by 98 days.

(21) Appl. No.: 18/008,683

(22) PCT Filed: Jul. 6, 2021

(86) PCT No.: PCT/CN2021/104626
§ 371 (c)(1),
(2) Date: Dec. 7, 2022

(87) PCT Pub. No.: WO2022/007770
PCT Pub. Date: Jan. 13, 2022

(65) Prior Publication Data
US 2023/0231660 A1    Jul. 20, 2023

(30) Foreign Application Priority Data
Jul. 8, 2020 (CN) .......................... 202010651763.8

(51) Int. Cl.
*H04L 1/1812*  (2023.01)
*H04L 1/1829*  (2023.01)

(52) U.S. Cl.
CPC .......... *H04L 1/1816* (2013.01); *H04L 1/1854* (2013.01)

(58) Field of Classification Search
CPC ... H04L 1/1816; H04L 1/1854; H04L 1/1819; H04L 1/189; H04L 1/1822; H04L 1/1896; H04L 1/1812; H04L 1/1607
See application file for complete search history.

(56) References Cited

U.S. PATENT DOCUMENTS

2010/0284364 A1* 11/2010 You ................. H04L 1/1887
                                                          370/330
2016/0212750 A1*  7/2016 Xu .................. H04B 7/0456
(Continued)

FOREIGN PATENT DOCUMENTS

| CN | 110169094 A | 8/2019 |
| WO | 2020/068252 A1 | 4/2020 |
| WO | 2020/085885 A1 | 4/2020 |

OTHER PUBLICATIONS

International Search Report and Written Opinion mailed on Sep. 23, 2021, received for PCT Application PCT/CN2021/104626, filed on Jul. 6, 2021, 8 pages including English Translation.
(Continued)

*Primary Examiner* — Steve N Nguyen
(74) *Attorney, Agent, or Firm* — XSENSUS LLP

(57) ABSTRACT

The present disclosure relates to an electronic device, a communication method and a storage medium in a wireless communication system. There is provided an electronic device for a transmitter, comprising a processing circuitry configured to: perform an initial transmission and blind transmissions of a transport block to a receiver by a configured Hybrid Automatic Repeat reQuest (HARQ) process, the blind transmissions being planned to be performed within a predetermined time window after the initial transmission; perform detection for a HARQ feedback from the receiver, the HARQ feedback indicating whether decoding for the transport block at the receiver is successful or not; and control to cancel or continue the blind transmissions based on a result of the detection.

5 Claims, 18 Drawing Sheets

(56) References Cited

U.S. PATENT DOCUMENTS

| | | | |
|---|---|---|---|
| 2018/0199359 A1* | 7/2018 | Cao | H04L 1/1896 |
| 2019/0068261 A1* | 2/2019 | Priyanto | H04L 1/189 |
| 2020/0021402 A1* | 1/2020 | Xu | H04L 1/1887 |
| 2020/0229229 A1* | 7/2020 | Chen | H04L 1/08 |
| 2022/0287011 A1* | 9/2022 | Liu | H04L 1/1825 |
| 2022/0303055 A1* | 9/2022 | Wu | H04W 28/26 |
| 2023/0072619 A1* | 3/2023 | Yin | H04L 1/0023 |

OTHER PUBLICATIONS

CATT, "Discussion on mixed blind and HARQ-based retransmissions", 3GPP TSG-RAN WG2 Meeting #110-e, R2-2004981, Jun. 1-Jun. 12, 2020, 8 pages.

Qualcomm Incorporated, "Remaining MAC issues", 3GPP TSG RAN WG2 #110-e, R2-2005575, Jun. 1-5, Jun. 8-12, 2020, pp. 1-13.

* cited by examiner

ELECTRONIC DEVICE, COMMUNICATION METHOD AND STORAGE MEDIUM

CROSS-REFERENCE TO RELATED APPLICATIONS

This application is based on PCT filing PCT/CN2021/104626, filed Jul. 6, 2021, which claims priority to Chinese Patent Application No. 202010651763.8, filed Jul. 8, 2020, the entire contents of each are incorporated herein by reference in its entirety.

FIELD OF THE INVENTION

The present disclosure relates to data transmission methodology. In particular, the present disclosure relates to an electronic device, a communication method, and a storage medium for data transmission combining Hybrid Automatic Repeat reQuest (HARQ) with blind transmissions.

BACKGROUND

In a mobile communication network, a user located at edge of a cell with a limited coverage may suffer from worse channel conditions, resulting in that a block error rate (BLER) requirement for data transmission or reception cannot be met within one Transmission Time Interval (TTI). In order to improve the communication performance for the user at the edge of the cell, the 4G LTE network introduces a concept of TTI bundling, i.e., a transmitter transmits the same transport block repetitively in multiple TTIs, the transmissions forming a bundle as a basic unit of a HARQ transmission, and a receiver performs joint decoding on the data received in the multiple TTIs, and feeds back a HARQ feedback indicating whether the decoding is successful or not after all of the transmissions are completed. This may improve an overall performance for the user at the edge of the cell. A similar bundling scheme also exists in the 5G New Radio (NR) system.

However, such bundling schemes have certain disadvantages. In the conventional bundling transmission scheme as shown in FIG. 1, the transmitter performs, for example, 4 transmissions in a bundle, and if the receiver decodes data of the first transmission correctly, it still waits to feed back an Acknowledgement (ACK) to the transmitter until all transmissions by the transmitter are completed. This may cause the transmitter to waste superfluous transmission resources for unnecessary repetitive transmissions, and also bring a superfluous feedback latency. However, in a NR system, for example, some services, such as ultra-reliable low-delay communication (URLLC) services, pose high requirements on latency.

In addition, for application scenarios such as vehicle-to-everything (V2X), the NR provides support for Sidelink communications that allow UEs to communicate directly with each other through no base station. Currently, the Sidelink communication does not support the TTI bundling. However, if the existing bundling transmission scheme is directly applied to the Sidelink communication to improve the communication performance, one problem to be considered is that in the Sidelink transmission scenario, an interval between available TTIs is further enlarged, and the latency problem of the bundling transmission is further obvious.

Therefore, there is a need to improve the conventional data transmission methodology to overcome the above disadvantages, especially to be applicable to the application scenarios of the Sidelink communication while ensuring the reliability and latency of the data transmission.

SUMMARY OF THE INVENTION

The present disclosure provides a hybrid transmission scheme combining the HARQ mechanism and controllable blind transmissions. With one or more aspects of the present disclosure, the above-identified need is met.

A brief summary regarding the present disclosure is given here to provide a basic understanding on some aspects of the present disclosure. However, it will be appreciated that the summary is not an exhaustive description of the present disclosure. It is not intended to identify key portions or important portions of the present disclosure, nor to limit the scope of the present disclosure. It aims at merely describing some concepts about the present disclosure in a simplified form and serves as a preorder of a more detailed description to be given later.

According to one aspect of the present disclosure, there is provided an electronic device for a transmitter, comprising a processing circuitry configured to: perform an initial transmission and blind transmissions of a transport block to a receiver by a configured Hybrid Automatic Repeat reQuest (HARQ) process, the blind transmissions being planned to be performed within a predetermined time window after the initial transmission; perform detection for a HARQ feedback from the receiver, the HARQ feedback indicating whether decoding for the transport block at the receiver is successful or not; and control to cancel or continue the blind transmissions based on a result of the detection.

According to one aspect of the present disclosure, there is provided an electronic device for a receiver, comprising a processing circuitry configured to: receive a plurality of transmissions of a transport block from a transmitter by a configured Hybrid Automatic Repeat reQuest (HARQ) process, the plurality of transmissions including an initial transmission and blind transmissions planned to be performed within a time window after the initial transmission; based on at least a part of the plurality of transmissions, perform decoding for the transport block; and send a HARQ feedback indicating whether the decoding is successful or not to the transmitter, for the transmitter to control to cancel or continue the blind transmissions.

According to one aspect of the present disclosure, there is provided an electronic device for a transmitter, comprising a processing circuitry configured to: select, from a first resource pool for Sidelink communication, transmission resources for performing an initial transmission of a transport block to a receiver by a configured Hybrid Automatic Repeat reQuest (HARQ) process; and select, from a second resource pool for Sidelink communication, transmission resources for performing blind transmissions of the transport block to the receiver by the HARQ process, wherein the first resource pool is different from the second resource pool.

According to one aspect of the present disclosure, there is provided an electronic device for a receiver, comprising a processing circuitry configured to: receive continuously, via a Sidelink communication, an initial transmission and blind transmissions of a transport block from a transmitter by a configured Hybrid Automatic Repeat reQuest (HARQ) process, wherein transmission resources for receiving the initial transmission are from a second resource pool, and transmission resources for receiving the blind transmissions are from a second resource pool, and wherein the first resource pool is different from the second resource pool.

According to one aspect of the present disclosure, there is provided communication method, comprising: performing an initial transmission and blind transmissions of a transport block to a receiver by a configured Hybrid Automatic Repeat reQuest (HARQ) process, the blind transmissions being planned to be performed within a predetermined time window after the initial transmission; performing detection for a HARQ feedback from the receiver, the HARQ feedback indicating whether decoding for the transport block at the receiver is successful or not; and controlling to cancel or continue the blind transmissions based on a result of the detection.

According to one aspect of the present disclosure, there is provided communication method, comprising: receiving a plurality of transmissions of a transport block from a transmitter by a configured Hybrid Automatic Repeat reQuest (HARQ) process, the plurality of transmissions including an initial transmission and blind transmissions planned to be performed within a time window after the initial transmission; based on at least a part of the plurality of transmissions, performing decoding for the transport block; and sending a HARQ feedback indicating whether the decoding is successful or not to the transmitter, for the transmitter to control to cancel or continue the blind transmissions.

According to one aspect of the present disclosure, there is provided communication method, comprising: selecting, from a first resource pool for Sidelink communication, transmission resources for performing an initial transmission of a transport block to a receiver by a configured Hybrid Automatic Repeat reQuest (HARQ) process; and selecting, from a second resource pool for Sidelink communication, transmission resources for performing blind transmissions of the transport block to the receiver by the HARQ process, wherein the first resource pool is different from the second resource pool.

According to one aspect of the present disclosure, there is provided a communication method, comprising: receiving continuously, via a Sidelink communication, an initial transmission and blind transmissions of a transport block from a transmitter by a configured Hybrid Automatic Repeat reQuest (HARQ) process, wherein transmission resources for receiving the initial transmission are from a second resource pool, and transmission resources for receiving the blind transmissions are from a second resource pool, and wherein the first resource pool is different from the second resource pool.

According to one aspect of the present disclosure, there is provided a non-transitory computer readable storage medium storing executable instructions which, when executed, perform any of the above communication methods.

DESCRIPTION OF THE DRAWINGS

A better understanding of the present disclosure may be achieved by referring to a detailed description given hereinafter in connection with accompanying figures, wherein the same or similar reference signs are used to indicate the same or similar elements throughout the figures. The figures are included in the specification and form a part of the specification along with the following detailed descriptions, for further illustrating embodiments of the present disclosure and for explaining the theory and advantages of the present disclosure. Wherein.

Further features and aspects of the present disclosure will become apparent from the following description with reference to the attached drawings.

DETAILED DESCRIPTION OF PREFERRED EMBODIMENTS

Various illustrative embodiments of the present disclosure will be described hereinafter with reference to the drawings. For purpose of clarity and simplicity, not all implementations of the embodiments are described in the specification. Note that, however, many settings specific to the implementations can be made in practicing the embodiments of the present disclosure according to specific requirements, so as to achieve specific goals of the developers. Furthermore, it will be appreciated that the developing work will be a routine task, despite complex and tedious, for those skilled in the art who benefit from the present disclosure.

In addition, to avoid obscure the present disclosure with unnecessary details, the figures illustrate only steps of a process and/or components of a device that are closely related to the technical solutions according to the present disclosure. The following descriptions of the illustrative embodiments are merely explanatory and should not be regarded as any limit to the scope of the present disclosure and the applications thereof.

For convenient explanation of the technical solutions of the present disclosure, various aspects of the present disclosure will be described below in the context of 5G NR. However, it should be noted that this is not a limitation on the scope of application of the present disclosure. One or more aspects of the present disclosure can also be applied to various existing wireless communication systems, such as the 4G LTE/LTE-A, or various wireless communication systems to be developed in future. The architecture, entities, functions, processes and the like as described in the following description can be found in the NR or other communication standards.

Overview

Figure 2:
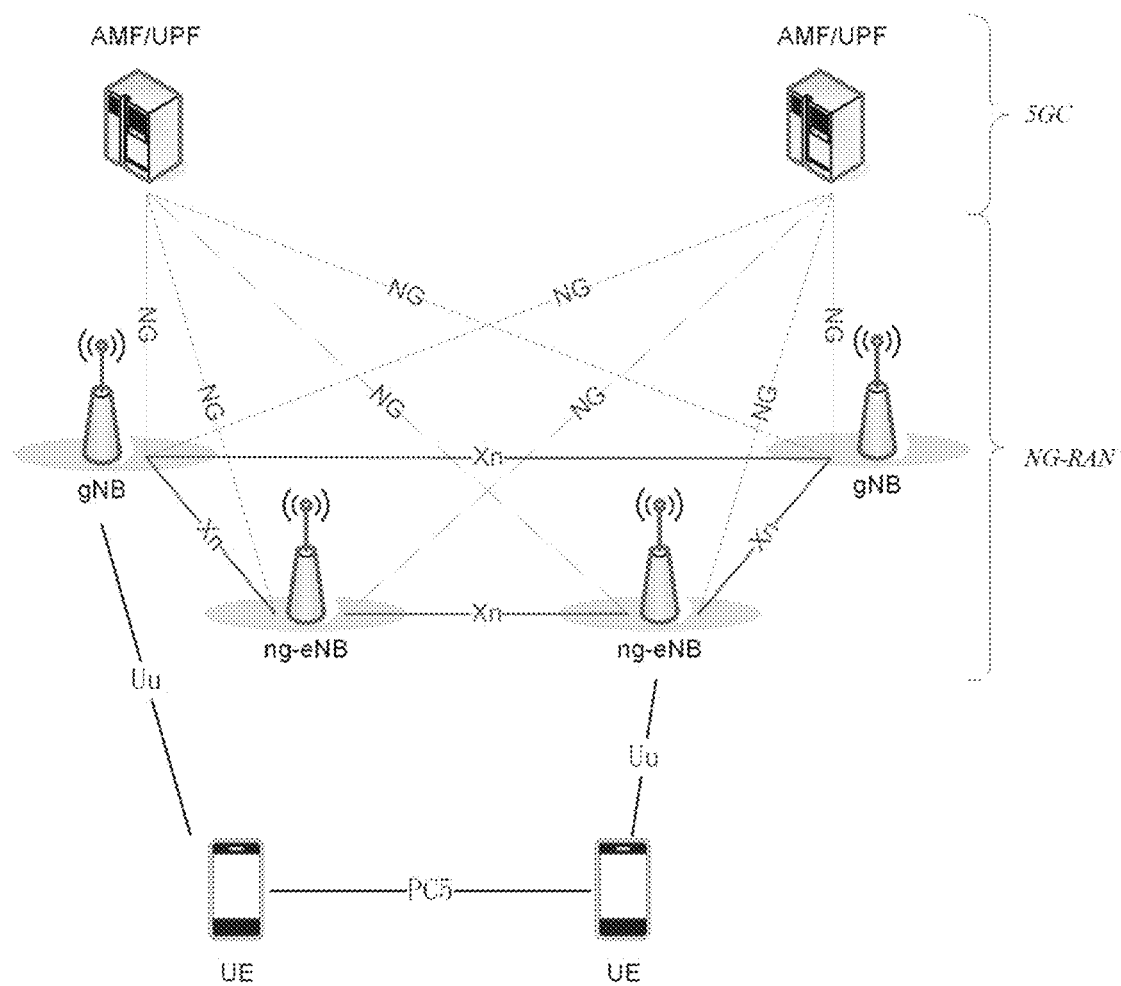
FIG. 2 is a simplified diagram showing the architecture of a 5G NR communication system.

FIG. 2 is a simplified diagram showing an architecture of the 5G NR communication system. As shown in FIG. 2, on the network side, radio access network (NG-RAN) nodes of the NR communication system include gNBs and ng-eNBs, wherein the gNB is a newly defined node in the 5G NR communication standard, and it is connected to 5G core network (5GC) via a NG interface, and provides NR user plane and control plane protocols terminating with a terminal equipment (also referred to as "user equipment", hereinafter referred to as "UE"); the ng-eNB is a node defined to be compatible with the 4G LTE communication system, and it can be upgradation of evolved Node B (eNB) of the LTE radio access network, connects a device to the 5G core network via the NG interface, and provides user plane and control plane protocols for evolved universal terrestrial radio access (E-UTRA) terminating with the UE. Hereinafter. The gNB and ng-eNB are collectively referred to as "base station".

However, it should be noted that the term "base station" used in the present disclosure is not limited to the above two types of nodes, but as an example of a control device in a wireless communication system, and has the full breadth of its usual meaning. For example, in addition to the gNB and ng-eNB specified in the 5G communication standard, depending on the scenario in which the technical solution of the present disclosure is applied, the "base station" may also be, for example, an eNB in the LTE communication system, a remote radio head, a wireless access point, a relay node, a drone control tower, or a communication device that performs similar control functions. Application examples of the base station will be described in detail in the following chapter.

In addition, in the present disclosure, the term "UE" has the full breadth of its usual meaning, and includes various terminal devices or in-vehicle devices that communicate with the base station. As an example, the UE may be a terminal device such as a mobile phone, a laptop computer, a tablet computer, an in-vehicle communication device, a drone, or the like. Application examples of the UE will be described in detail in the following chapter.

The wireless interface of NR communication system is inherited from the LTE system, and the wireless interface between the UE and the gNB/ng-eNB is still referred to as a Uu interface for short. The UE performs, for example, uplink and downlink communications with the base station via the Uu interface. In addition, as shown in FIG. 2, the NR communication system also supports direct communications between UEs, that is, a Sidelink communication is carried out via a PC5 interface between UEs, so that the communication between UEs does not go through the base station. For the sake of illustration, the following description focuses on NR Sidelink communication, but it should be understood that one or more aspects of the present disclosure can also be applied to LTE Sidelink communication or other similar direct inter-UE communications.

Wireless interface protocols are mainly used to establish, reconfigure and release various wireless bearer services. The wireless interface protocol stack of Access Stratum (AS) is divided into three layers in two planes. The three layers include a physical layer (L1), a data link layer (L2), and a network layer (L3). The two planes refer to the control plane and the user plane.

Figure 3A:
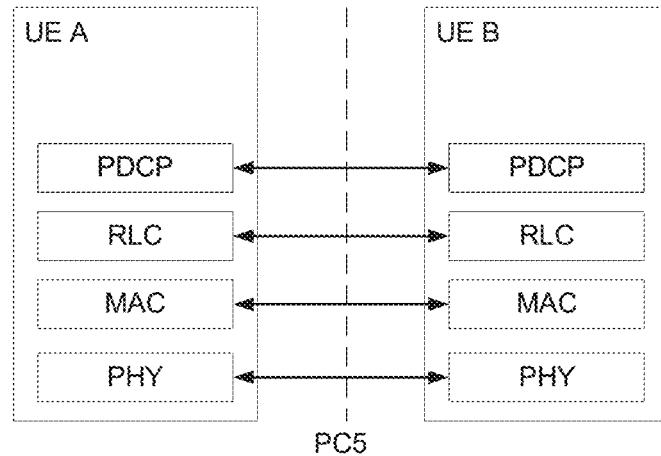
FIGS. 3A and 3B illustrate radio interface protocol stacks for a user plane and a control plane of the Sidelink communication, respectively.
Figure 3B:
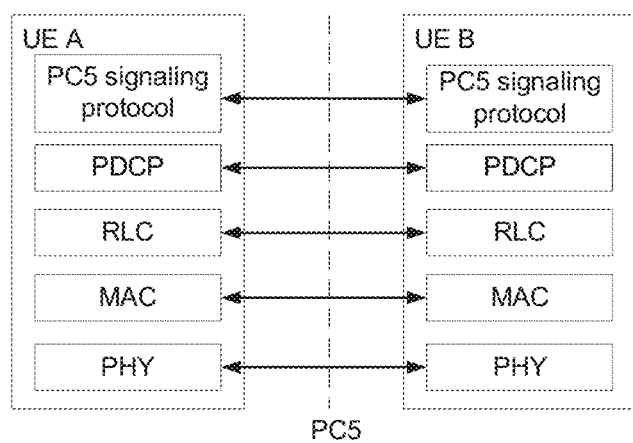
Figure 4A:
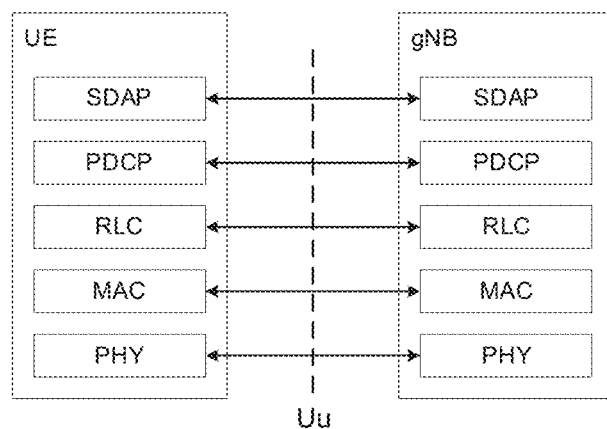
FIGS. 4A and 4B illustrate radio interface protocol stacks for a user plane and a control plane of a Uu link communication, respectively.
Figure 4B:
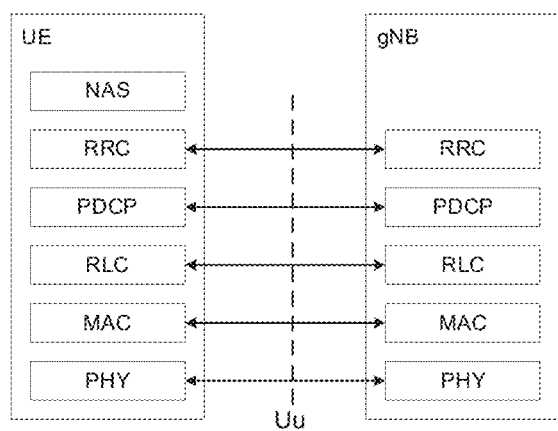

FIGS. 3A and 3B show wireless interface protocol stacks for the user plane of the PC5 interface and the control plane used for one-to-one Sidelink communication, respectively. FIGS. 4A and 4B show wireless interface protocol stacks for the user plane and the control plane of the Uu interface, respectively.

Layer 1 (L1) of the wireless interface protocol stacks is a physical (PHY) layer which implements various physical-layer signal processing to provide a transparent transmission function for signals. The physical layer provides various transport channels for the above Layer 2, such as physical uplink control channel (PUCCH), physical uplink shared channel (PUSCH), physical downlink control channel (PDCCH), physical downlink shared channel (PDSCH), physical Sidelink control channel (PSCCH), physical Sidelink shared channel (PSSCH) for carrying data and control information.

Layer 2 (L2) of the wireless interface protocol stacks is above the physical layer and is responsible for managing wireless links between the UE and the base station or another UE. As shown in FIGS. 3A-3B, in the user plane and the control plane of the PC5 interface, the L2 layer includes a medium access control (MAC) sublayer, a radio link control (RLC) sublayer, and a packet data convergence protocol (PDCP) sublayer. Among them, the MAC sublayer is responsible for resource allocation or resource selection for the transport channels, or the like. Moreover, an upper-layer PC5 signaling protocol is included in the control plane of the PC5 interface.

Similarly, as shown in FIGS. 4A-4B, in the user plane of the Uu interface, the L2 layer includes a MAC sublayer, an RLC sublayer, and a PDCP sublayer, and a service data adaptation protocol (SDAP) sublayer. In the control plane, the L2 layer includes a MAC sublayer, an RLC sublayer, and a PDCP sublayer, and the L3 layer includes a radio resource control (RRC) sublayer which is responsible for acquiring radio resources and for configuring the lower layers with RRC signaling.

It should be noted that the term "transmission resources" or "resources" used in the present disclosure refers to radio resources, such as time-domain resources and frequency-domain resources, that are scheduled by the base station or autonomously selected by the UE for transmitting control information and data. However, as those skilled in the art can understand, the transmission resources may also include space-domain resources, code-domain resources, or the like. Time-frequency transmission resources in the 5G NR are described below in combination with FIG. 5.

Figure 5:
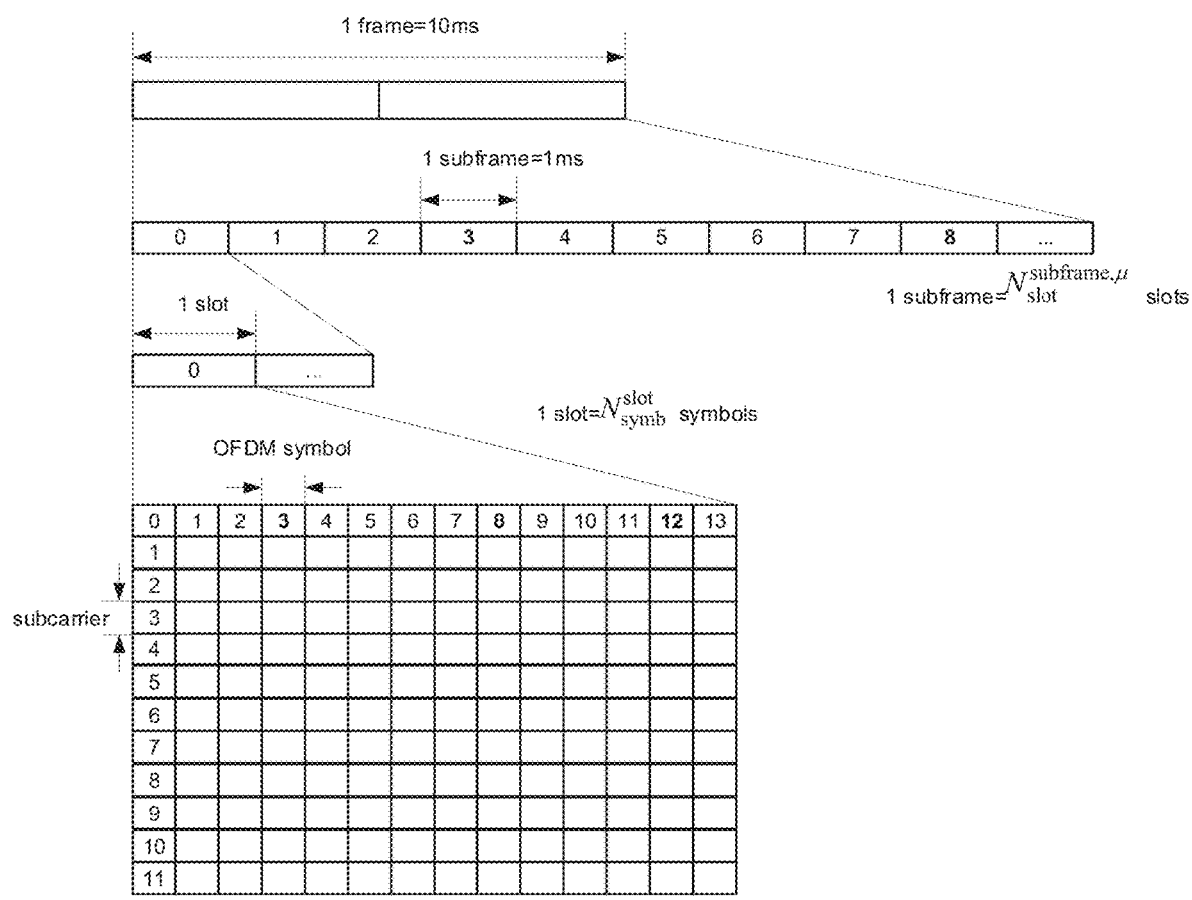
FIG. 5 illustrates a diagram of a frame structure in the NR communication system.

In the 5G NR, the downlink transmission, the uplink transmission and the Sidelink transmission are organized into frames. FIG. 5 shows a diagram of a frame structure in the NR communication system. As shown in FIG. 5, each frame has a length of 10 ms, and is divided into 10 subframes equal in size, each of which is of 1 ms. Unlike the LTE communication system, the frame structure in the NR communication system has a flexible framework that depends on the subcarrier spacing. Each subframe has a configurable number of $N_{slot}^{subframe,\mu}$ slots, e.g., 1, 2, 4, 8 or 16. Each slot also has a configurable number of $N_{symb}^{slot}$ OFDM symbols, with 14 consecutive OFDM symbols per slot for a normal cyclic prefix or 12 consecutive OFDM symbols per slot for an extended cyclic prefix. In the frequency-domain dimension, each slot comprises several resource blocks (RBs), each resource block containing, for example, 12 consecutive subcarriers in the frequency domain. Thus, resource elements (REs) in a slot may be represented using a resource grid, as shown in FIG. 5. The resource blocks may be divided into a data section and a control section. The resource elements in the control section may be allocated for transmission of control information. The data section may include resource elements that are not included in the control section, and can be allocated for transmitting data to the base station.

The scheduling period of transmission resources is a Transmission Time Interval (TTI), and generally in unit of one slot, OFDM symbols within one slot are allocated to a UE in a consecutive manner. Multi-slot scheduling and cross-slot scheduling are also possible. In addition, NR supports a more efficient scheduling decision for low latency, allowing scheduling of transmissions on a scale of OFDM symbols. A TTI represents the length of a transmission on a radio link which can be decoded independently, with each TTI corresponding to a Transport Block (TB).

The 5G NR manages the data transmission by means of a HARQ entity in the MAC sublayer. The HARQ entity may maintain multiple parallel HARQ processes, each of which is associated with a respective HARQ process ID.

HARQ uses a stop-and-wait protocol to transmit data. A HARQ process at a transmitter stops to wait for acknowledgement information after transmitting a transport block. A corresponding HARQ process at a receiver receives the transport block, and performs acknowledgement (ACK) or negative acknowledgement (NACK) for the transport block with 1-bit information based on a result of the decoding for the TB. The receiver transmits a HARQ feedback after a predetermined time interval (e.g., k slots) since it has received the transport block. In a case of ACK, the transmitter may use the HARQ process for transmitting a next transport block. If the HARQ feedback is NACK, the transmitter performs a retransmission of this transport block using the same HARQ process. Such retransmission scheduled by relying on the HARQ feedback is referred to herein as "a HARQ retransmission". Accordingly, a retransmission that does not rely on the HARQ feedback scheduling is referred to as "a blind transmission".

Figure 1:
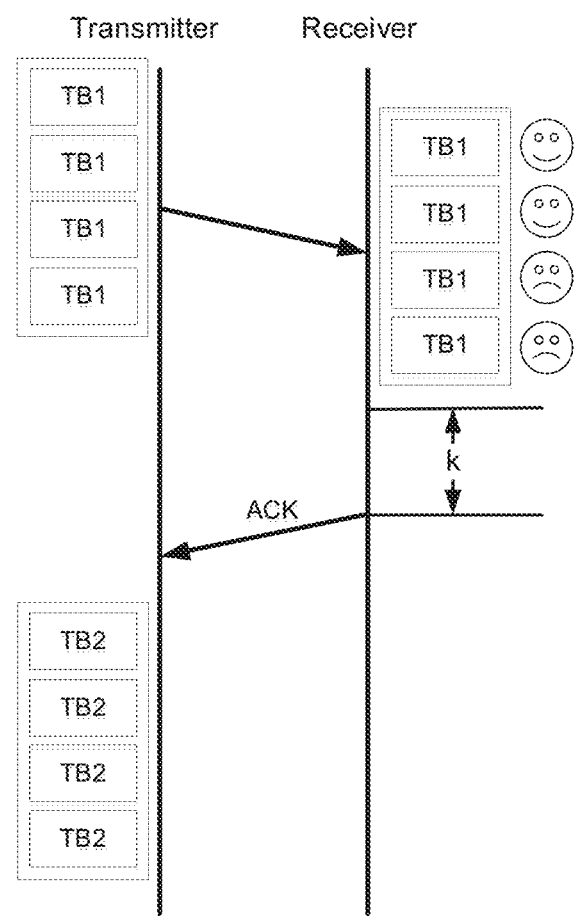
FIG. 1 illustrates the conventional bundling transmission scheme.

When the transmission success rate needs to be improved by multiple repetitive transmissions, the conventional HARQ retransmission has a significant disadvantage in latency, because the receiver always waits for k slots to send ACK or NACK for each transmission. The NR communication system supports the use of TTI bundling in the uplink or downlink transmission, and the efficiency of HARQ feedback is improved. Taking the downlink transmission as example, when the MAC entity is configured with pdsch-AggregationFactor>1, the transmitter repetitively transmits the same transport block within a bundle of transmission resources for pdsch-AggregationFactor times, and the receiver feeds back ACK or NACK only once after all transmissions are received, as shown in FIG. 1.

However, as mentioned in the previous chapter, even if the data in the transport block is decoded successfully on the first transmission, it needs to wait for the predetermined time interval (e.g., k slots) to send the HARQ feedback after all transmissions in the bundle are completed. With the existing bundling scheme, the higher the bundling degree is, i.e., the more transmissions in the bundle are, the higher the decoding success rate of the transport block may be, but the more redundant transmissions may occur. Therefore, there is a trade-off between the transmission efficiency and the transmission reliability.

Furthermore, the existing Sidelink communications still employ the conventional HARQ retransmission, i.e., the HARQ feedback corresponds to a single transmission. The problem of latency may be more obvious if the idea of TTI bundling is applied to the Sidelink communication scenario to improve the transmission success rate. In a mode in which the UE autonomously selects Sidelink transmission resources, the transmitting UE selects available transmission resources from a resource pool by sensing. Unlike a mode in which the resources are scheduled by the base station, the interval between TTIs autonomously selected by the UE may be large and not fixed, and the latency of the bundling transmissions may be too long to meet requirements of some services.

In view of the above, the present disclosure proposes a more flexible data transmission mechanism, and balances the efficiency and reliability of data transmission by an adjustable bundling degree. Exemplary embodiments of the present disclosure will be described in detail below.

Exemplary Embodiments of the Present Disclosure

Figure 6:
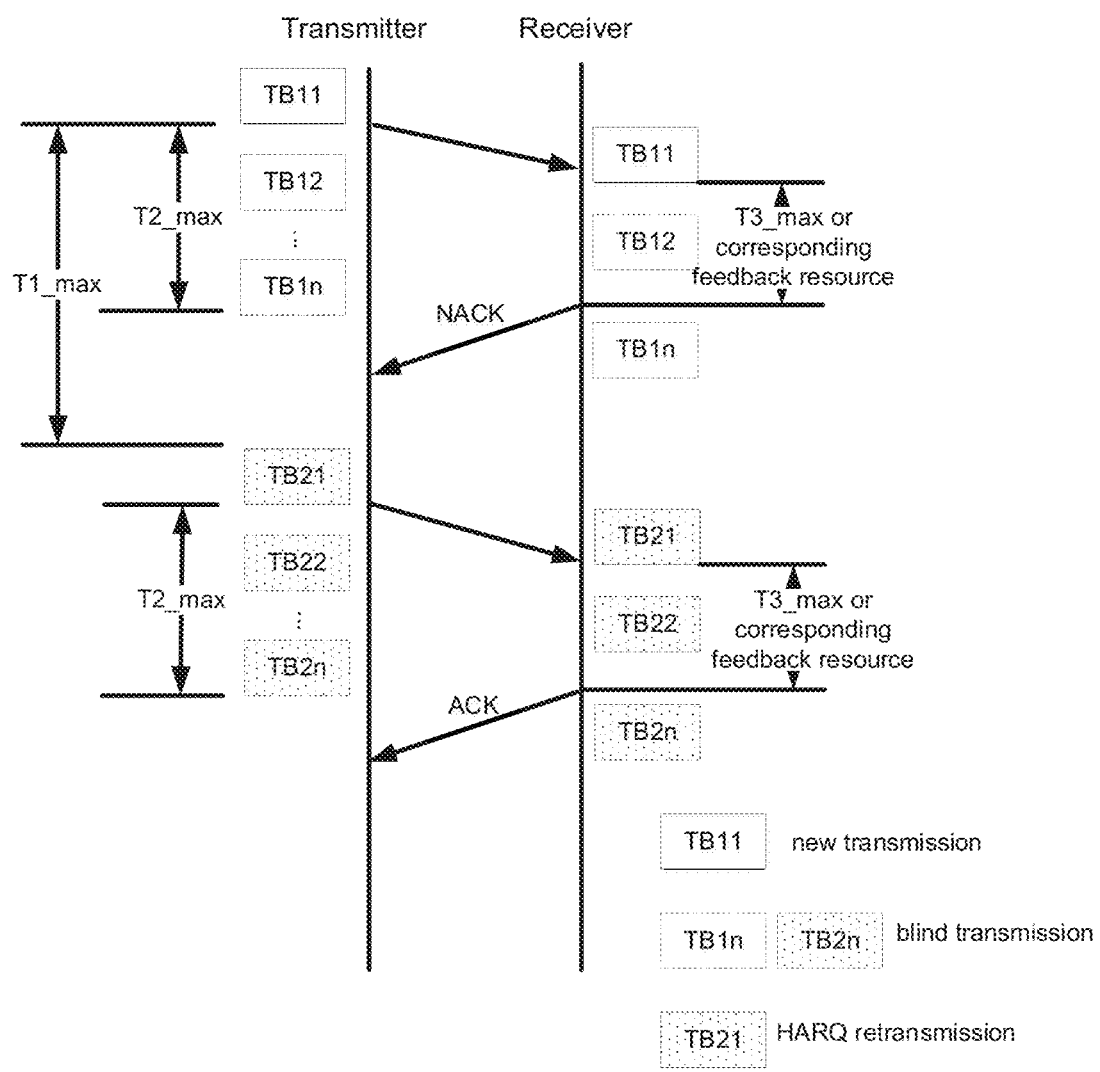
FIG. 6 is a schematic illustration of the hybrid data transmission according to an exemplary embodiment.

FIG. 6 is a schematic diagram of the hybrid data transmission according to the exemplary embodiments. The transmitter and the receiver may be a base station or a UE depending on different communication scenarios. For example, in the uplink communication via, for example, the Uu interface, the transmitter is a UE and the receiver is a base station, and in the downlink communication, the transmitter is a base station and the receiver is a UE. In the Sidelink communication via, for example, the PC5 interface, the transmitter is a UE (transmitting UE), and the receiver is also a UE (receiving UE).

When there is data to be transmitted, the transmitter processes data from the MAC sublayer as a transport block, for example, a transport block TB in FIG. 6. The transport block needs to undergo a series of physical layer processing in order to be mapped to a transport channel at the physical layer. The physical layer processing generally includes Cyclic Redundancy Check (CRC) addition, channel coding, physical-layer HARQ processing, rate matching, scrambling, modulation, layer mapping, transform precoding, and so forth. By means of various signal processing functions at the physical layer, a bitstream of the transport block is encoded and modulated into OFDM symbols and transmitted by an antenna array to the receiver using allocated time-frequency resources. The receiver decodes the data of the transport block through an inverse processing of the above signal processing.

The HARQ process assigned to the transport block inverts a value of associated New Data Indication (NDI) to indicate that the HARQ process starts transmitting a new transport block. For ease of illustration, the first transmission of a new transport block is referred to as "a new transmission", as indicated by $TB_{11}$ in FIG. 6.

As shown in FIG. 6, within a predetermined time window after the new transmission of the transport block, the transmitter may continue repetitive transmission(s) of the transport block with no need to wait a HARQ feedback from the receiver, that is, the transmitter will plan "blind transmission (s)" of the same transport block, as indicated by $TB_{12}$-$TB_{1n}$ in FIG. 6. Depending on preconfigured transmission parameters, the transmitter may apply a redundancy version to the transport block in each transmission according to a preconfigured sequence of redundancy versions. Therefore, the transport block $TB_{12}$-$TB_{1n}$ in each transmission can comprise respective redundancy versions in addition to the same data.

The time window may be defined by introducing a timer T2, and the timer T2 has a timeout period of T2_max, which may be regarded as a time range in which the transmitter can perform the blind transmission(s). In one example, the activation of the timer T2 and/or the value of the timeout period T2_max may be configured by the base station, e.g., through RRC layer signaling. In another example, the activation of the timer T2 and/or the value of the timeout period T2_max may be determined by the transmitter itself based on a type of the service, communication scenario, latency requirement, reliability requirement, and the like. The transmitter may start T2 when the new transmission of the transport block is completed.

Before the timer T2 expires, the transmitter uses available transmission resources for blind transmission(s) of the transport block. The transmission resources may be scheduled by the base station, for example, in the Uu link communication or in the Sidelink communication that uses the first resource allocation mode, the transmission resources required by the new and blind transmission(s) are scheduled by the base station. If some of the transmission resources scheduled by the base station fall outside the time window, the transmitter may perform the transmissions only on the transmission resources within the time window. Furthermore, the transmission resources may be selected autonomously by the UE, for example, in the second resource allocation mode of the Sidelink communication, the transmitting UE autonomously selects time-frequency resources from a resource pool for the transmissions, which will be described in detail later.

However, when the resource is in shortage, there may be a case where there is no transmission resource available for blind transmission(s) within the time window, and the transmitter will not perform the blind transmission(s) in this case.

Preferably, the number of blind transmission(s) should be less than a predetermined number. The maximum number of transmissions e_REPETITION_NUMBER may be configured. The maximum number of transmissions may be configured to the transmitter and the receiver through an existing RRC parameter, such as pdsch-AggregationFactor or DL_REPETITION_NUMBER. Certainly, the maximum number of transmissions e_REPETITION_NUMBER may also be a newly defined RRC parameter, especially for the Sidelink communication scenario, and the base station configures the parameter indicating the maximum number of transmissions to the transmitter and the receiver through RRC layer signaling. The configuration of the maximum number of transmissions can enable the transmitter to know an upper limit of the number of transmissions and enable the receiver to know an upper limit of the number of receptions.

Both of the new transmission and subsequent blind transmission(s) use the same HARQ process, that is, the transport block TB1 always has the same HARQ process ID. From this perspective, a group of transmissions (as indicated by $TB_{11}$ through $TB_{1n}$ in FIG. 6) including a new transmission and possibly blind transmission(s) can be considered as "a bundle". It should be understood that unlike the conventional bundling, the number of transmissions within the bundle of the present disclosure is not fixed, i.e., has an adjustable degree of bundling.

The receiver may receive the transport block using a configured HARQ process. The HARQ processes of the receiver and the transmitter have the same HARQ process ID, and the control information of the transport block may carry the HARQ process ID as an identifier. The HARQ process at the receiver processes only one transport block in one Transmission Time Interval (TTI). The HARQ process at the receiver has an independent HARQ buffer for soft combination of the received data. In the example shown in FIG. 6, the receiver, when receiving $TB_{11}$ in the new transmission, stores it in the buffer and attempts to decode it; if the decoding is successful, the receiver does not need to process subsequent transmissions; if the decoding fails, $TB_{12}$ in the second transmission (a blind transmission) is received and jointly decoded with the previously received $TB_{11}$ in the buffer, and so on. The receiver feeds back ACK or NACK based on the decoding result.

According to the exemplary embodiments of the present disclosure, the receiver can support taking the time at which the transport block is first received as a start time of the HARQ feedback timing, i.e., the HARQ feedback is performed after a time period since the transport block $TB_{11}$ in the new transmission is received. This is different from the existing bundling transmission scheme in which the start time of the HARQ feedback timing is the time at which the last transport block is received, as described above with reference to FIG. 1. As an example, the receiver may start a timer T3 when the transport block $TB_{11}$ of the new transmission is received, and a timeout period of the timer T3 is T3_max. The activation of the timer T3 and/or the value of the timeout period may be preconfigured by the base station or may be determined by the receiver itself based on various factors. Based on the result of the decoding on at least a part of the transport blocks received before the timer T3 expires, the receiver transmits ACK or NACK after the timer T3 expires.

Alternatively, in the case where a HARQ feedback resource has been allocated for each of the transmissions of a transport block, the receiver may perform the HARQ feedback on a feedback resource corresponding to the new transmission. For example, in the Sidelink communication scenario, a HARQ feedback resource for each transmission may be allocated on Physical Sidelink Feedback Channel (PSFCH). The receiver may send ACK or NACK using the feedback resource based on a decoding result for at least the part of the transport blocks received before the feedback resource is available.

The transmitter may perform detection for the HARQ feedback from the receiver and control the performance of blind transmission(s) accordingly. Specifically, if the transmitter has not received the HARQ feedback, the transmitter continues to schedule and perform blind transmission(s) within the time window. If the transmitter has received the ACK, the transmitter may cancel blind transmission(s) that have not been completed within the time window and use the HARQ process for a next transport block (not shown). If the transmitter receives NACK, the transmitter may cancel blind transmission(s) that have not been completed within the time window, or alternatively, the transmitter may continue blind transmission(s) that have not been completed within the time window until the timer T2 expires.

In a case where the transmitter receives NACK, it indicates that the transport block is not successfully decoded by the receiver. In this case, the transmitter may plan a retransmission of the transport block, which depends on the HARQ feedback and is so-called "HARQ retransmission", as indicated by $TB_{21}$ in FIG. 6. As an example, the transmitter may use a timer T1 (with a corresponding timeout period T1_max), where the timer T1 is started when the new transmission of the transport block is completed, and after the timer T1 expires, the transmitter starts to perform the HARQ retransmission of the transport block. The activation of the timer T1 and/or the value of the timeout period T1_max may be preconfigured by the base station or may be determined by the transmitter itself based on various factors.

A subsequent group of transmissions starting with the HARQ retransmission (the HARQ retransmission and following blind transmission(s)) is similar to the previous group of transmissions starting with the new transmission (the new transmissions and following blind transmission(s)) as described above. Specifically, the transmitter may plan blind transmission(s) ($TB_{22}$~$TB_{2n}$) within a time window following the HARQ retransmission ($TB_{21}$), and control the blind transmission(s) based on a HARQ feedback from the receiver for this group of transmissions, and the receiver may perform HARQ feedback after the timer T3 expires or on a feedback resource corresponding to the HARQ retransmission. The timer T1 and/or T2 may be started when the HARQ retransmission is completed.

Thus, there is no substantial difference in the behavior of each group of bundling transmissions ($TB_{11}$~$TB_{1n}$, $TB_{21}$~$TB_{2n}$) for the same transport block, except that the HARQ retransmission is triggered by NACK. For this reason, in the context of the present disclosure, unless otherwise indicated, the first transmission in each group of bundling transmissions is collectively referred to as "an initial transmission" and is intended to include the new transmission and the HARQ retransmission of the same transport block.

The bundling transmissions according to the exemplary embodiments consist of the "initial transmission" and subsequent "blind transmission(s)", wherein the performance of the blind transmissions is controlled by a HARQ feedback from the receiver, allowing more flexible bundling transmissions and supporting earlier HARQ feedback compared to the conventional bundling transmission scheme. As a result, the data transmission according to the present disclosure may achieve a better trade-off between the transmission reliability and the latency.

Signaling procedures for the data transmission according to the exemplary embodiments are described below.

In general, the allocation mode of transmission resources for the data transmission includes the base station-scheduling resource allocation and UE autonomous resource selection. Taking the Sidelink communication as example, a first resource allocation mode is the base station-scheduling resource allocation mode, i.e., the UE requests transmission resources from the base station in a condition that a Radio Resource Control (RRC) connection with the base station has been established, and then the base station schedules resources to the UE for transmitting Sidelink control information and data. The Sidelink communication also includes a second resource allocation mode in which resources are autonomously selected by the UE, i.e., the UE itself may select resources from one or more resource pools for transmitting the Sidelink control information and data. Furthermore, for a communication via the Uu interface, transmission resources required by uplink or downlink data transmissions are both scheduled by the base station.

In the following, taking the Sidelink communication as example, signaling procedures of the data transmission according to the exemplary embodiments in the two resource allocation modes are described, respectively.

Figure 7:
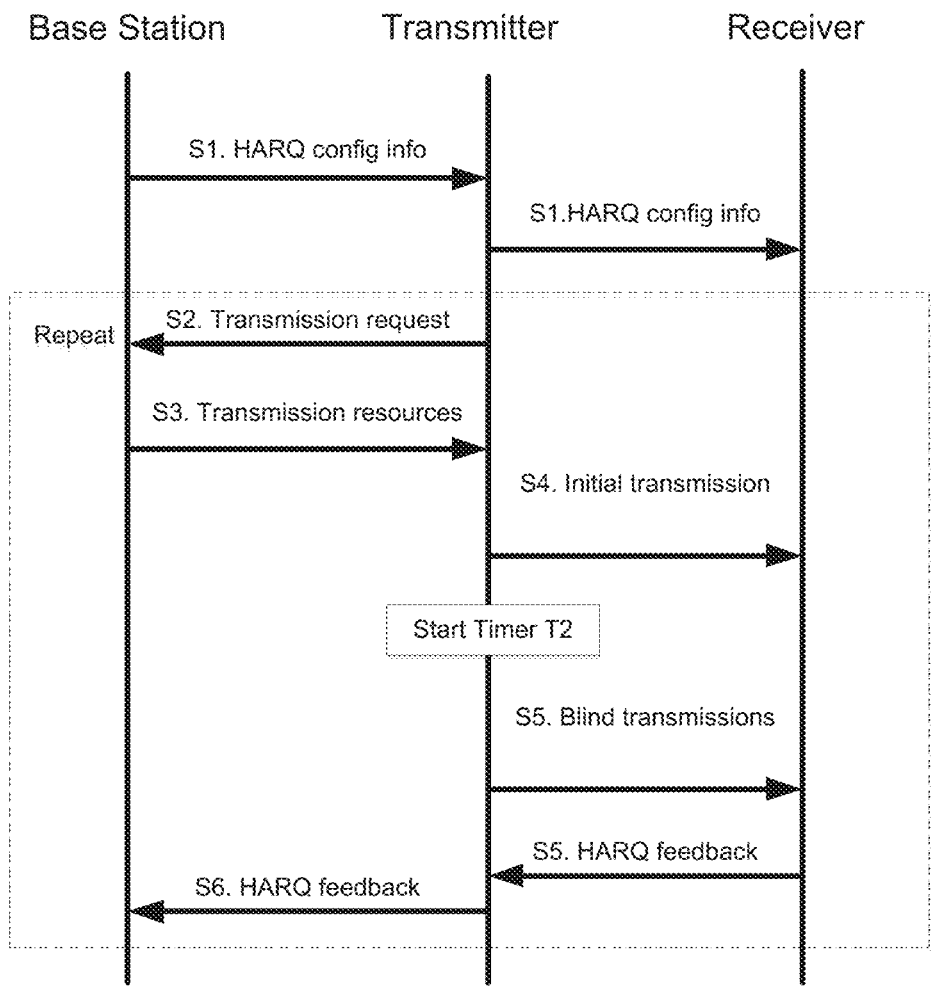
FIG. 7 shows a signaling procedure in a base station-scheduling resource allocation mode.

FIG. 7 shows a signaling procedure in the base station-scheduling resource allocation mode, wherein the transmitter is a transmitting UE and the receiver is a receiving UE. Before the data transmission begins, the base station may configure HARQ parameters to the transmitter and the receiver (step S1). The HARQ configuration information may include, for example, a HARQ process ID, a redundancy version sequence, and the like. In one example, the HARQ configuration information may also include a maximum number of transmissions to define an upper limit of the number of transmissions within a bundle. In one example, the HARQ configuration information may include configuration information regarding one or more of the timers T1, T2 and T3.

In step S2, when there is data to be transmitted, the transmitter may transmit a transmission request, such as a Scheduling Request (SR) and/or a Buffer Status Report (BSR), to the base station to request transmission resources for transmitting a data transport block.

In response to the transmission request from the transmitter, the base station schedules transmission resources for the transport block, such as time-frequency resources, to the transmitter. The base station may allocate a set of transmission resources for the initial transmission and following blind transmission(s) at once. Preferably, the base station allocates the transmission resources such that all of the blind transmission(s) can be completed within a predetermined time window, i.e., an interval between the time-domain resources for the blind transmission(s) and the time-domain resource for the initial transmission does not exceed the timeout period T2_max of the timer T2. Preferentially, in allocating the resources, the base station may consider the maximum number of transmissions e_REPETITION_NUMBER for the transport block, i.e., may allocate resources for transmissions equal to or less than the maximum number of transmissions (the initial transmission+the blind transmission(s)).

In particular, in the Sidelink communication scenario, the scheduled transmission resources are from one or more Sidelink resource pools configured for the transmitter. One resource pool is a set of resources usable by the UE to select for Sidelink transmission and/or reception, and in the frequency domain, each resource pool is composed of numSubchannel consecutive subchannels, and each subchannel is composed of subchannelsize consecutive physical resource blocks (PRBs), where numSubchannel and subchannel are both high layer parameters.

In step S3, the base station indicates the allocated transmission resources to the transmitter. For example, in a resource scheduling manner for Dynamic Grant, the base station may indicate the time-frequency resources by using DCI including the resource assignment information. In a grant-free resource scheduling manner, the base station may configure available time-frequency resources (e.g., a Sidelink resource pool) to the transmitter in advance through RRC layer signaling, and then activate the pre-configured time-frequency resources by using DCI including the resource assignment information, so that the transmitter may directly use the pre-configured time-frequency resources for data transmission without requesting the base station to send a grant each time.

Subsequently, the transmitter may perform data transmission on the allocated transmission resources. Specifically, in step S4, the transmitter performs the initial transmission (the new transmission of the transport block) using the first one of the allocated transmission resource, and starts the timer T2. In step S5, the transmitter performs blind transmission(s) using subsequent ones of the allocated transmission resources before the timer T2 expires. In addition, the transmitter may start the timer T1 when the initial transmission is completed.

Figure 8:
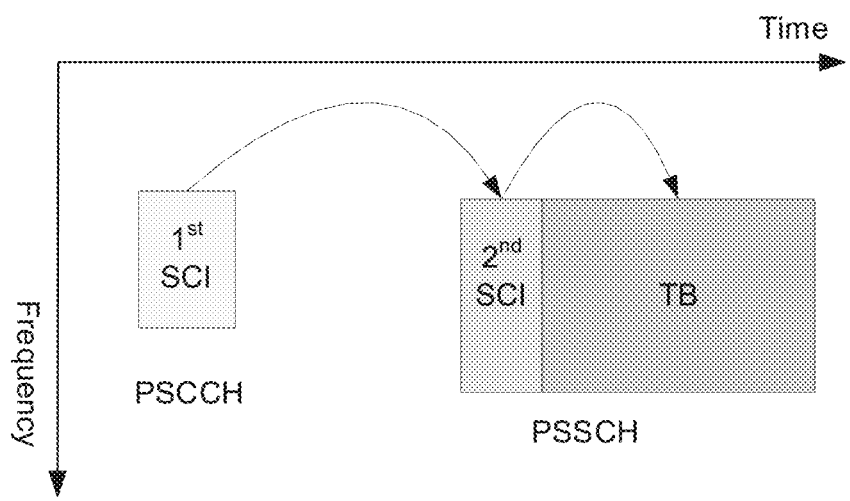
FIG. 8 shows a relationship between control information and a transport block for the Sidelink data transmission.

The Sidelink data transmission is briefly described herein in connection with FIG. 8. For each transmission, the transmitter may generate "first-stage SCI" by populating corresponding fields. The first-stage SCI is transmitted on PSCCH, which is used to schedule the PSSCH carrying transport blocks and SCI on the PSSCH (this SCI is referred to as "second-stage SCI"). The first-stage SCI may include the following fields: "priority" indicating a priority of the scheduled PSSCH; "frequency resource assignment" indicating frequency domain resources for the scheduled PSSCH; "time resource assignment" indicating time domain resources for the scheduled PSSCH; "resource reservation period"; "DMRS pattern"; "format for second-stage SCI"; "β offset indicator"; "number of DMRS ports"; "modulation and coding scheme", and the like. After processing such as Cyclic Redundancy Check (CRC) addition, channel coding, rate matching, multiplexing and the like, the transmitter transmits the first-stage SCI through the PSCCH. By receiving and decoding the first-stage SCI broadcast by the transmitter, the receiver will be able to learn about information on the time-frequency resources for monitoring the PSSCH, information on decoding the second-stage SCI on the PSSCH, and so on.

Next, the transmitter generates the second-stage SCI containing information for decoding the PSSCH. The second-stage SCI may include the following information: a HARQ process ID; New Data Indication (NDI); Redundancy Version; a source ID; a destination ID; CSI request and the like. The second-stage SCI and the Transport Block (TB) to be transmitted are multiplexed on the PSSCH after a series of processing such as CRC addition, channel coding, HARQ processing, rate matching, and the like. The receiver may receive the second-stage SCI and the transport block on the PSSCH using the time-frequency resources included in the first-stage SCI, and perform decoding.

Based on a result of the decoding, the receiver may send ACK or NACK after the timer T3 started upon receiving the initial transmission expires, or may send ACK or NACK on a feedback resource corresponding to the initial transmission, see step S6 in FIG. 7. The transmitter may transmit the HARQ feedback from the receiver to the base station.

Upon receiving the HARQ feedback, the transmitter may control blind transmission(s) that have not been completed based on a predetermined criterion. In one example, the transmitter cancels blind transmission(s) that have not been completed, regardless of whether the HARQ feedback is ACK or NACK. In another example, if the HARQ feedback is ACK, the transmitter may cancel blind transmission(s) that have not been completed, and if the HARQ feedback is NACK, the transmitter may continue blind transmission(s) that have not been completed, and the blind transmissions may be used for the receiver to continue decoding for the transport block.

When the receiver has indicated NACK, the transmitter may perform a next group of bundling transmissions by starting a HARQ retransmission, i.e., repeat the steps in the dashed-line box in FIG. 7. In a case where there is the timer T1, the transmitter may perform the HARQ retransmission and subsequent blind transmission(s) of the transport block using transmission resources scheduled by the base station after the timer T1 expires.

It should be understood that although the signaling procedure among the three entities of the base station, the transmitter (the transmitting UE) and the receiver (the receiving UE) has been described above with the Sidelink communication as example, the signaling procedure shown in FIG. 7 may be similarly applied to a communication via the Uu interface, in which case the base station itself is either the transmitter (for a downlink communication) or the receiver (for an uplink communication).

Figure 9:
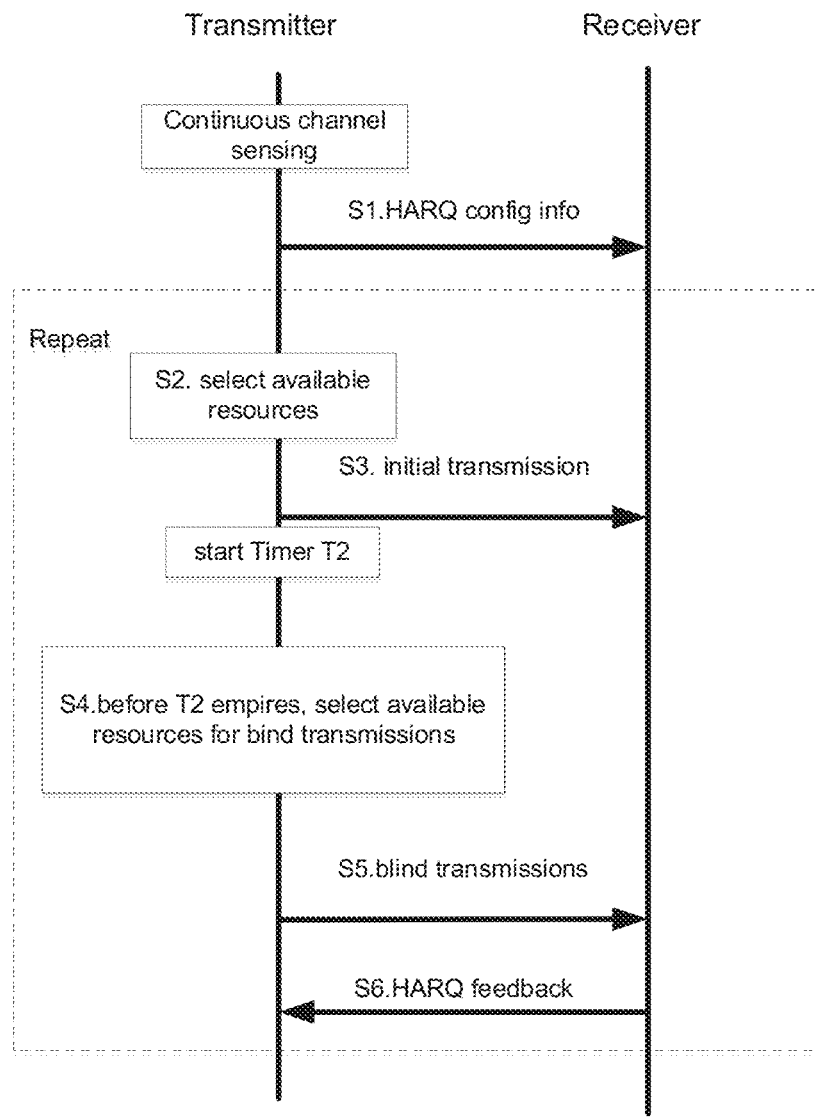
FIG. 9 shows a signaling procedure in a UE autonomous resource allocation mode.

FIG. 9 shows a signaling procedure in the UE-autonomous resource allocation mode, where the transmitter is a transmitting UE and the receiver is a receiving UE. In this resource allocation mode, the UE itself may select resources for transmitting Sidelink control information and data from one or more Sidelink resource pools that were configured in advance. In one Sidelink Control Period, the UE may select one of the resource pools for the Sidelink communication, and once the resource pool is selected, the selection is valid in the entire Sidelink Control Period. After the current Sidelink control period ends, the UE may perform the selection of resource pool again.

The transmitter obtains an occupancy of the resource pool by continuously carrying out channel sensing. In particular, during the sensing, the transmitter (the transmitting UE) continuously receives and decodes the first-stage SCIs broadcast by other UEs on the PSCCH, thereby gaining knowledge about time-frequency resources used by the other UEs for Sidelink communications, e.g., by means of the "frequency resource assignment" and "time resource assignment" fields, and knowing which resources in the selected resource pool have been used. Therefore, the transmitter can select those transmission resources for data transmission which are not used by the other UEs from the resource pool so as to avoid inter-UE interference.

Before the data transmission is started, the base station may configure HARQ parameters to the transmitter and the receiver (step S1). The HARQ configuration information may include, for example, a HARQ process ID, a redundancy version sequence, and the like. Further, the HARQ configuration information may further include the maximum number of transmissions and/or configuration information regarding one or more of the timers T1, T2 and T3.

When there is data to be transmitted, the transmitter may select, with the UE-autonomous resource selection mode, a time-frequency resource that can be used for the initial transmission of the transport block from the resource pool based on the above-described result of channel sensing (step S2).

In step S3, the transmitter performs the initial transmission (the new transmission of the transport block) using the selected time-frequency resource, and starts the timer T2. As described above with reference to FIG. 8, the transmitter may generate the first-stage SCI for scheduling PSSCH carrying the transport block, which contains information on time frequency resources, format for the second-stage SCI, and the like. Then, the transmitter also generates the second-stage SCI and multiplexes it with the transport block on the PSSCH.

Before the timer T2 expires, the transmitter may plan blind transmission(s) (step S4). Based on the result of channel sensing, the transmitter selects resources usable for the blind transmission(s) from a resource pool. The selected transmission resources should fall within a predetermined time window, i.e., an interval between the time domain resources for the blind transmission(s) and the time domain resource for the initial transmission does not exceed the timeout period T2_max of the timer T2. In selecting resources, the transmitter may consider the maximum number of transmissions e_REPETITION_NUMBER for the transport block. In a case of shortage in resources, the transmitter may not even find any resource usable for the blind transmission(s), and in this case, the transmitter cannot perform the blind transmission(s).

In step S5, the transmitter performs the blind transmission(s) using subsequent transmission resources as allocated. The blind transmission(s) are similar to the initial transmission, and are not described in detail here.

The receiver may receive the transport block transmitted by the transmitter on corresponding transmission resources and perform decoding. Based on a result of the decoding, the receiver may send ACK or NACK after the timer T3 started upon receiving the initial transmission expires, or may send ACK or NACK on a feedback resource corresponding to the initial transmission, see step S6 in FIG. 9.

Upon receiving the HARQ feedback, the transmitter may control the blind transmissions that have not been completed based on a predetermined criterion. In one example, the transmitter cancels blind transmission(s) that have not been completed, regardless of whether the HARQ feedback is ACK or NACK. In another example, if the HARQ feedback is ACK, the transmitter may cancel blind transmission(s) that have not been completed, and if the HARQ feedback is NACK, the transmitter may continue blind transmission(s) that have not been completed, and the blind transmission(s) may be used by the receiver to continue decoding for the transport block.

When NACK has been indicated by the receiver, the transmitter may perform a next group of bundling transmissions by starting a HARQ retransmission, i.e., repeat the steps in the dashed-line box in FIG. 9. In a case where there is the timer T1, the transmitter may perform the initial transmission (the HARQ retransmission of the transport block) and subsequent blind transmission(s) using time-frequency resources selected based on the channel sensing after the timer T1 expires.

Figure 10:
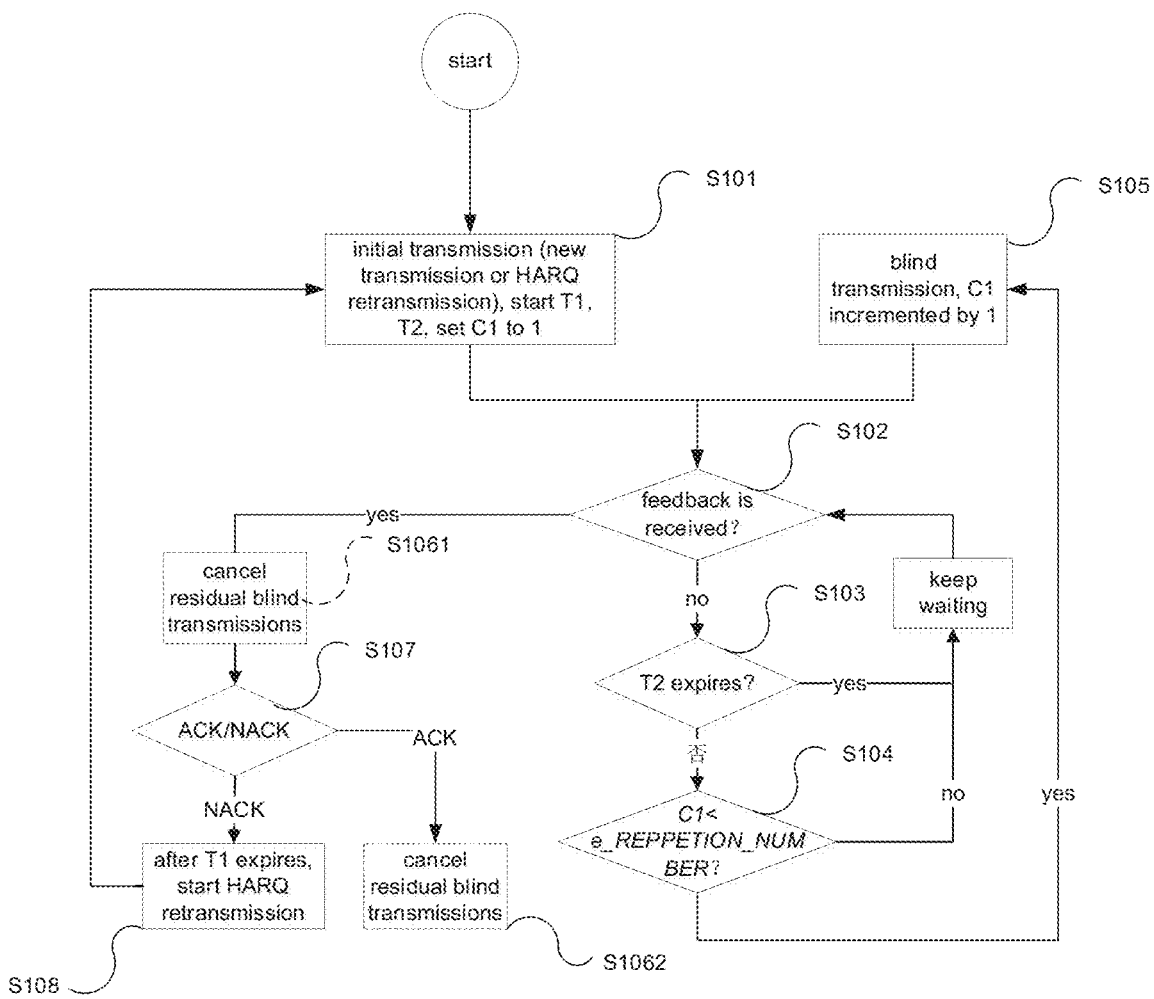
FIG. 10 is a flowchart illustrating a transmitting process according to an exemplary embodiment.

FIG. 10 is a flowchart illustrating a transmitting process performed on an electronic device at the transmitter according to the exemplary embodiments.

First, the transmitter starts an initial transmission within a bundle at S101. For a new transport block, the initial transmission is a "new transmission" of that transport block. As described above, the transmitter may perform the transmission by using a pre-configured HARQ process, and include a corresponding HARQ process ID in control information associated with this transmission. After the initial transmission is completed, the transmitter starts the timers T2 and T1, and sets a counter C1 to 1, wherein the counter C1 is used to count the number of transmissions.

The transmitter may identify the type of transmission by means of a parameter in the control information. In one example, a New Data Indication (NDI) is used to identify whether the transport block is new or not, and when a HARQ process processes a new transport block, it will invert the value of the NDI, e.g., from 1 to 0 or from 0 to 1, so that the inversion of the value of the NDI can be used to indicate the new transmission of the transport block. In addition, a HARQ Indication (HI) may also be used to identify whether it is a HARQ retransmission, for example, when the value of HI is set to 1, it indicates that this transmission is a HARQ retransmission scheduled in response to NACK.

Figure 11:
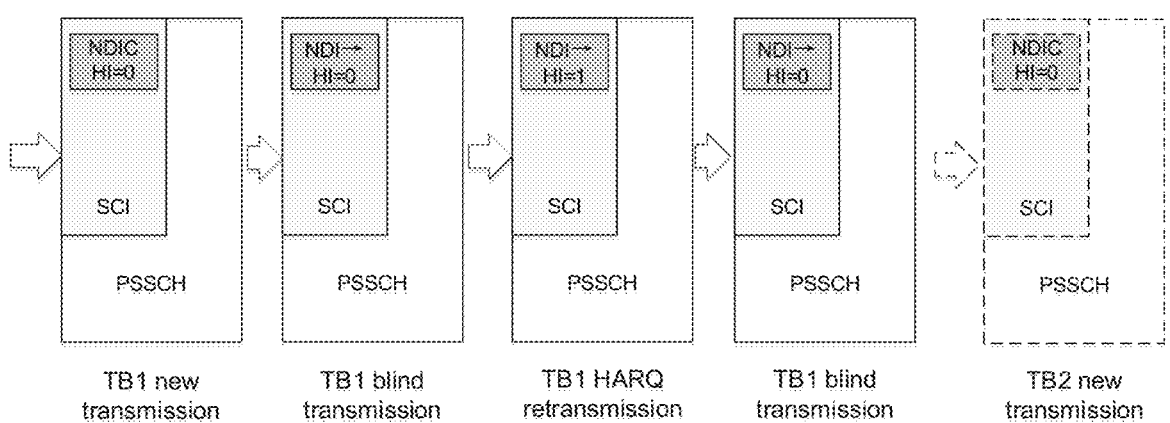
FIG. 11 illustrates cases of the control information corresponding to different types of transmission in the Sidelink communication scenario.

FIG. 11 illustrates cases of control information corresponding to different types of transmissions in the exemplary Sidelink communication scenario. As shown in FIG. 11, fields of NDI and HI may be contained in the second-stage SCI on the PSSCH, and the new transmission, the HARQ retransmission and the blind transmissions of a transport block will have different combinations of NDI and HI. As shown in FIG. 11, the new transmission of the transport block TB1 has an NDI value inverted with respect to the transport block TB0 (not shown) and HI is 0, the NDI value of the transport block TB1 in the HARQ retransmission is not inverted and HI is 1, and the NDI value of TB1 for the blind transmissions is not inverted and HI is 0.

In S102, the transmitter detects whether a HARQ feedback is received from the receiver. If no HARQ feedback is received, the receiving process proceeds to S103 to determine whether the timer T2 expires. If T2 does not expire, it is determined in S104 whether the number of transmissions C1 is less than the maximum number of transmissions e_REPETITION_NUMBER, and if not, blind transmission(s) are scheduled in S105 and the counter C1 is incremented by 1 after the blind transmission(s) are completed. The transmitter continues to detect whether a HARQ feedback is received after the blind transmission(s) (S102).

If it is detected in S102 that the HARQ feedback is received, the transmitter may control subsequent transmission(s) based on the HARQ feedback. Alternatively, as shown in S1061, upon receiving the HARQ feedback, the transmitter cancels blind transmission(s) that have not been completed. The transmitter continues to determine in S107 whether the HARQ feedback is ACK or NACK. On the one hand, if the HARQ feedback is ACK, which indicates that the transport block has been decoded by the receiver, the transmitter may start to transmit a next transport block. Alternatively, the transmitter may cancel blind transmission(s) that have not been completed so far, as shown in S1062. It should be understood that S1061 and S1062 are different examples of canceling the blind transmission(s).

On the other hand, if the HARQ feedback is NACK, the transmitter waits until the timer T1 expires, and after the T1 expires, requests transmission resources from the base station, or autonomously selects transmission resources by the transmitting UE, in order to initiate the HARQ retransmission (S108). The HARQ retransmission is the first transmission of the next group of bundling transmissions and the transmitting process returns to S101.

Figure 12:
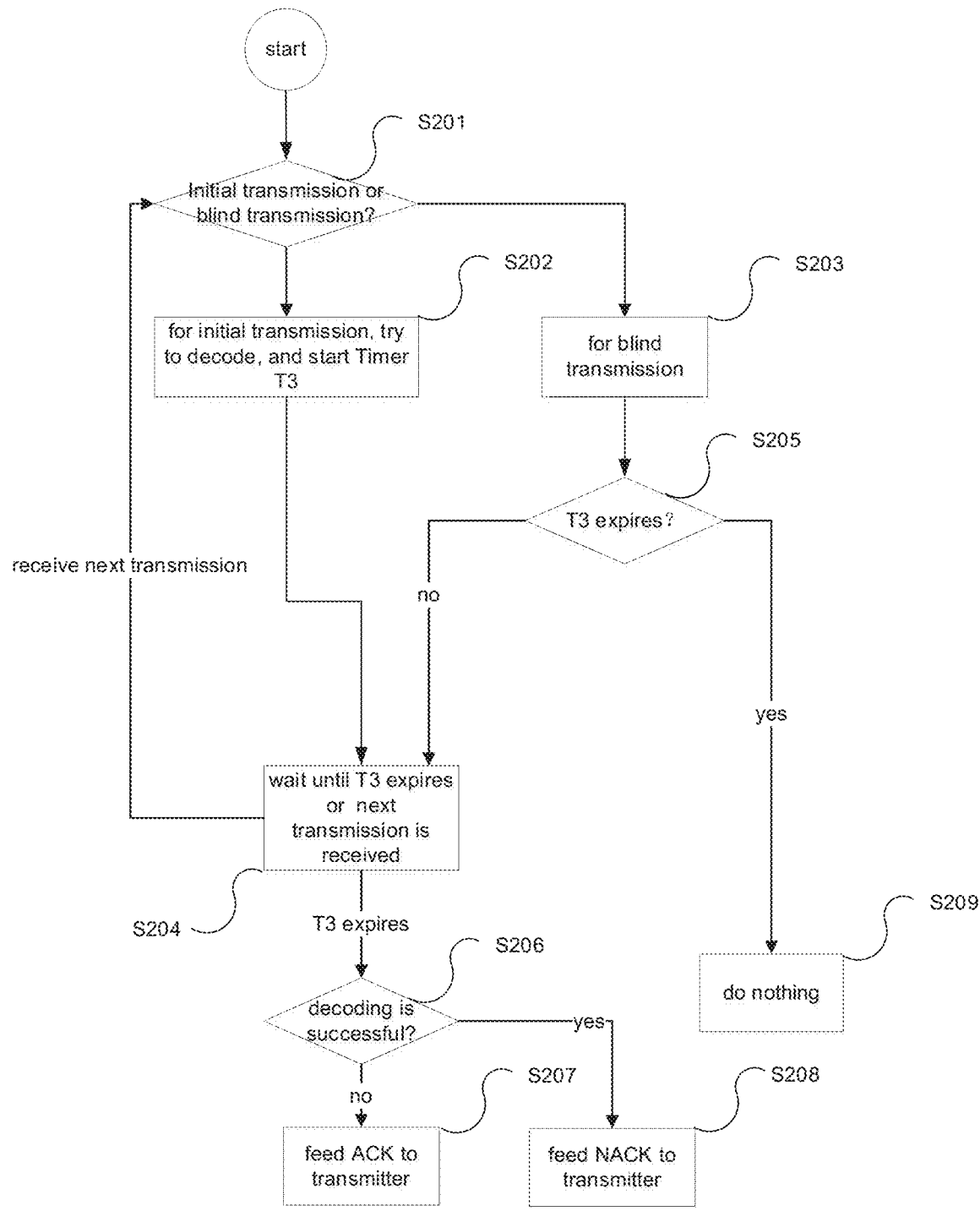
FIG. 12 is a flowchart illustrating a receiving process according to an exemplary embodiment.

FIG. 12 is a flowchart illustrating a receiving process performed on an electronic device at the receiver according to the exemplary embodiments. The receiving process may begin with the receipt of a transport block from the transmitter.

First, in S201, the receiver determines whether the received transmission is an initial transmission or a blind transmission. This determination may be made by identifying the control information associated with the transmission. As described above with reference to FIG. 11, the receiver may identify NDI and HI fields in the control information (e.g., the second-stage SCI, DCI, UCI, etc.). For example, when the value of NDI is identified to be inverted, the receiver determines that a new transport block is received, and this transmission is a new transmission, and when the value of HI is identified to be 1, the receiver determines that this transmission is a HARQ retransmission. At this point, the receiver determines the transmission as the initial transmission and attempts to decode the transport block (S202). In addition, the receiver may also start the timer T3 when the initial transmission is received.

Next, in S204, the receiver waits for a next transmission to be received or T3 to expire. On the one hand, if the receiver waits until T3 expires, the receiving process proceeds to S206.

On the other hand, if the receiver receives the next transmission before T3 expires, the receiving process returns to S201, and the receiver may determine it as a blind transmission based on the control information associated with the next transmission (S203), for example, by identifying that the value of NDI is not inverted and the value of HI is 0. Subsequently, in S205, the receiver determines whether the timer T3 has expired. If yes, the result of the blind transmission will not be included in the HARQ feedback, and the receiver will not perform any processing (S209). Despite this, the receiver may consider this transmission in the decoding processing of the next group of bundling transmissions to increase the decoding success rate. If it is determined in S205 that the timer T3 has not expired, the receiving process proceeds to S204, and the receiver may wait until the next transmission is received or the timer T3 expires.

In S206, the receiver determines whether the decoding is successful or not (S207). The receiver may perform joint decoding based on the currently received transport block and the previously received transport block, and if the final result of the decoding is successful, the receiver feeds back ACK to the transmitter (S207), otherwise, feeds back NACK to the transmitter (S208).

It should be understood that, although the timer T3 is utilized to determine whether the timing for HARQ feedback is reached in the receiving process shown in FIG. 12, the exemplary embodiments of the present disclosure are not limited thereto. Alternatively, in the case where a HARQ feedback resource has been allocated for the initial transmission, the receiver may monitor whether the feedback resource corresponding to the initial transmission is available in S205 and S204, instead of determining whether the timer T3 has expired. If the feedback resource corresponding to the initial transmission is available, the receiver performs the HARQ feedback on the feedback resource and ignores the blind transmission(s) received thereafter. If the feedback resource corresponding to the initial transmission is not available, the receiver continues to wait until the next transmission is received or the feedback resource is available.

Modification Example 1

In the exemplary embodiments described above, the receiver initiates the HARQ feedback with the initial transmission as a trigger, even if the initial transmission is not successful. Next, Modification Example 1 of the present disclosure will be described.

In Modification Example 1, the receiver starts HARQ feedback with the first successful decoding as a trigger instead. For the reception of a group of bundling transmissions, the HARQ feedback is triggered only if the receiver has successfully decoded the transport block or has completed the reception of all transmissions.

Figure 13:
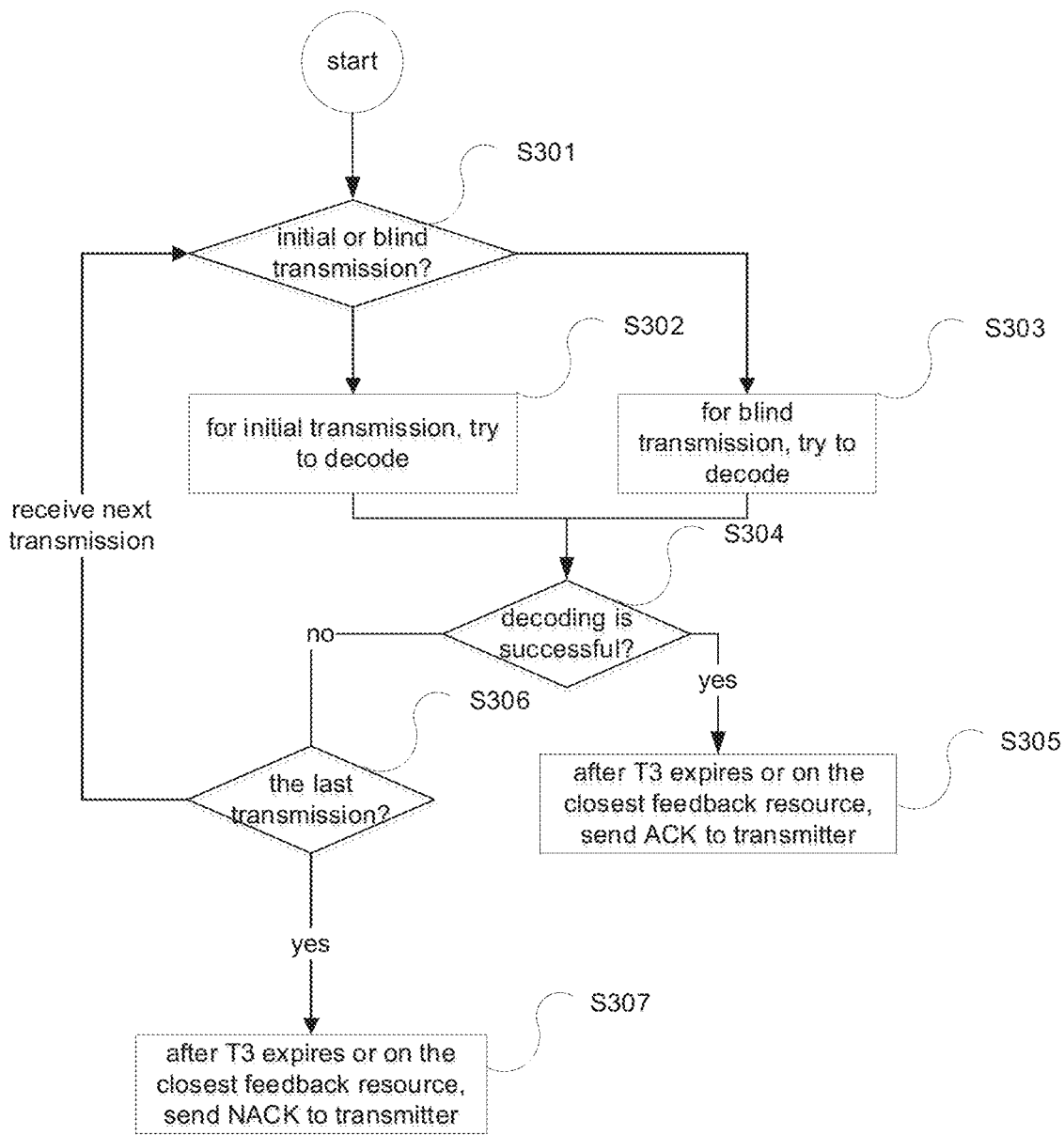
FIG. 13 is a flowchart showing a receiving process according to Modification Example 1.

FIG. 13 shows a flowchart of a receiving process according to Modification Example 1. The receiving process is performed on an electronic device at the receiver. The receiving process may begin with the receipt of a transport block from the transmitter.

As in the receiving process described with reference to FIG. 12, the receiver first determines in S301 whether the transmission just received is an initial transmission or a blind transmission, for example, based on the NDI and HI fields in the associated control information.

When it is determined to be the initial transmission, the receiver attempts to decode the transport block in the initial transmission (S302). Next, the receiver determines whether the decoding is successful (S304).

On the one hand, if the decoding fails, the receiver further determines whether the transmission is the last transmission (S306). In one example, if the receiver does not receive the next transmission within a predetermined window (T2_max) after the initial transmission, it may determine that the transmission is the last transmission. In another example, the receiver may set a counter for counting the number of transmissions, and may determine that the transmission is the last transmission if the value of the counter reaches the maximum number of transmissions e_REPETITION_NUMBER.

If it is determined that the current transmission is the last transmission, in S307, the receiver may set a timer T3 for HARQ feedback, and send NACK to the transmitter after the timer T3 expires. Alternatively, in S307, the receiver may feed back NACK on a feedback resource closest in time, instead of using the timer 3.

In a case that the transmission is determined not to be the last transmission, the receiver may wait for the next transmission, and the receiving process returns to S301. The transmission received then is determined to be a blind transmission (S303), the receiver may perform joint decoding based on the transport block received previously and the transport block received at this time, and the receiving process proceeds to S304.

On the other hand, if it is determined in S304 that the decoding is successful, the receiver may set a timer T3 for HARQ feedback and send ACK to the transmitter after the timer T3 expires. Alternatively, the receiver may feed back ACK on the feedback resource closest in time in S307.

According to Modification Example 1, the receiver triggers the HARQ feedback only if the transport block is successfully decoded or all received transmissions are fully utilized, which avoids a situation that NACK indicating a decoding failure is fed back when there are still blind transmissions that do not arrive, thereby contributing to an improvement of the transmission efficiency.

Modification Example 2

Next, Modification Example 2 of the present disclosure will be described.

Modification Example 2 supports setting different transmission priorities for an initial transmission and blind transmissions of the same transport block. Preferably, the priority of the blind transmission may be set to be lower than that of the initial transmission (a new transmission or a HARQ retransmission). The reason for such setting is that the blind transmissions mainly play a role of improving the transmission reliability for the communication, and are less important than the new transmission and the HARQ retransmission. The transmitter may inform the receiver of the priorities set for the different transmissions through control information such as the first-stage SCI, DCI, UCI, etc., so that the receiver performs priority-based receiving process.

By using the priority setting of Modification Example 2, the data transmission can be managed more flexibly, especially in the Sidelink communication scenario. Since resources occupied by the Sidelink communication are uplink resources, both LTE and NR need to handle a case where a given UE has both of the Sidelink communication transmission and the uplink transmission, and need to prioritize and decide which type of transmission to perform in case of an uplink/Sidelink communication collision. According to Modification Example 2, the blind transmissions are set with a lower priority, with correspondingly lower importance, so that when the transmitting/receiver is facing with an uplink/Sidelink communication collision, it is possible to decide how to transmit/receive data transmissions depending on the priorities of the different transmissions. For example, the transmitting/receiver may preferentially process the uplink transmission having a higher priority.

In addition, in the Sidelink communication scenario in which, for example, the second resource allocation mode is adopted, the transmitting UE needs to perform the channel sensing and select transmission resources by itself, so that there is a certain probability of collision for transmitting data between different UEs. By lowering the priority of blind transmissions, this part of resources may be allowed to be occupied by a traffic of another UE with a higher priority, which helps to improve the probability of successful communication of the high-priority traffic of another UE.

Modification Example 3

In the conventional bundling transmission scheme, transport blocks within the same bundle are transmitted using the same resources in the frequency domain. If the channel condition is poor for the frequency-domain resources, the bundling transmission scheme may not achieve an ideal effect even if it is adopted.

The bundling transmission according to the present disclosure consist of an initial transmission and independently planned blind transmission(s), making it possible to separately schedule resources for the initial transmission and resources for the blind transmission(s). This is different from the conventional bundling transmission scheme in which all transmissions of the bundle are always scheduled together. According to Modification Example 3, different frequency-domain transmission resources may be allocated for the initial transmission and the blind transmission(s) to achieve frequency diversity within the bundle.

The following specifically describes features of Modification Example 3, taking the Sidelink communication scenario as example.

In the base station-scheduling resource allocation mode described with reference to FIG. 7, the transmitter (the transmitting UE) may request resources only for the initial transmission (a new transmission or a HARQ retransmission) in S2, and the base station will schedule the resources for the initial transmission and indicate to the transmitter through, for example, DCI in S3. The resources scheduled by the base station may be from a first resource pool. For blind transmissions, the transmitter may select resources from the second resource pool by itself. Since the first resource pool and the second resource pool include different subchannels in the frequency domain, the initial transmission and the blind transmissions may use different resources in the frequency domain to obtain a resource diversity gain.

In the UE autonomous resource allocation mode described with reference to FIG. 8, the transmitter may select resources for the initial transmission from a first resource pool and resources for the blind transmissions from a different second resource pool in S2.

Preferably, in consideration of importance of the initial transmission and of the blind transmissions, the first resource pool may be a resource pool for Sidelink communications based on scheduling/sensing, where resources are used in a manner of being scheduled by the base station (the first resource allocation mode) or in a manner of being selected by the transmitter through channel sensing (the second resource allocation mode), so that a situation of resource preemption or collision is unlikely to occur, and thus the data transmission has a high reliability. The second resource pool may be a less reliable resource pool for Sidelink communications not based on scheduling/sensing, where the resources may be freely selected by multiple UEs, and thus a collision of communications may occur.

In the current NR standard, for the Sidelink communications not based on scheduling/sensing, only an exceptional pool of resources is defined, on which the UE randomly selects resources for a communication. However, the second resource pool may not be limited thereto. Future systems may provide support for random resource selection, and defines resource pools for Sidelink communications that are not based on scheduling/sensing, on which some low-priority/low-reliability traffic communications may be performed, in addition to the exceptional resource pool. The blind transmissions according to the present disclosure may be arranged on such resource pools.

Figure 14:
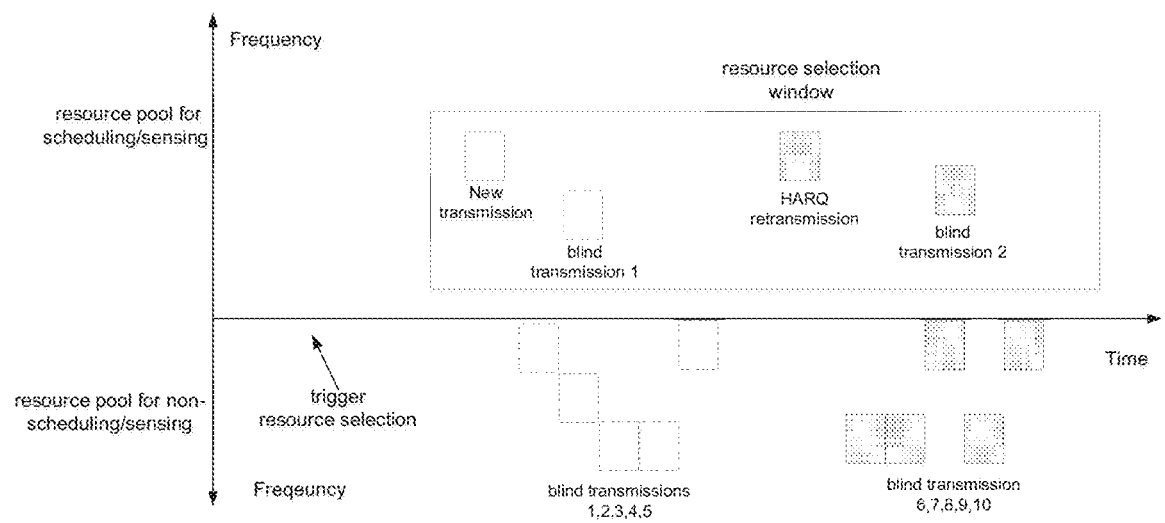
FIG. 14 illustrates a comparison between a conventional resource selection and a resource selection according to the present disclosure.

When the transmitter performs blind transmissions of a transport block on a non-scheduling/non-sensing resource pool such as an exceptional resource pool, it may select autonomously resource blocks consecutive in time to transmit the data, and the blind transmissions are adjacent in the time domain. FIG. 14 illustrates a comparison between the existing resource selection and the resource selection according to the present disclosure. In the existing scheme, the transmitting UE cannot guarantee that the resources selected from the scheduling/sensing resource pool through the sensing are adjacent in the time domain. According to Modification Example 3 of the present disclosure, the blind transmissions may utilize a non-scheduling/non-sensing resource pool, and the transmitter may make the selected resources adjacent in the time domain, so that more blind transmissions may be planned. As illustrated in FIG. 14, within the same time period (in the interval between the new transmission and the HARQ retransmission), the transmission resources available for the blind transmissions are selected only once from the scheduling/sensing resource pool, and the non-scheduling/non-sensing resource pool directly occupies 5 adjacent time slots for the transmitting the blind transmissions. Obviously, this helps to improve the transmission reliability and shorten the transmission latency.

The exemplary embodiments and modification examples of the present disclosure have been described above. It is understood that the various embodiments may be practiced separately or in combination, and all of them are within the spirit and scope of the present disclosure.

Electronic Device and Communication Method

Next, electronic devices and communication methods according to embodiments of the present disclosure are described.

Figure 15A:
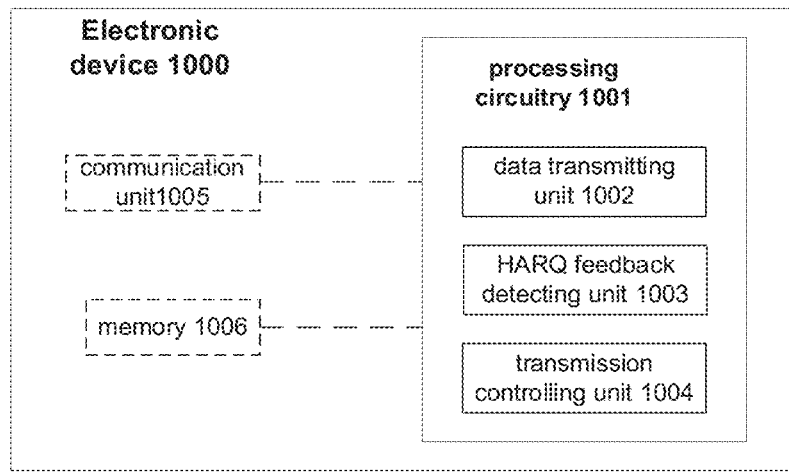
FIGS. 15A and 15B illustrate an electronic device for a transmitter and a communication method thereof, respectively, according to the present disclosure.
Figure 15B:
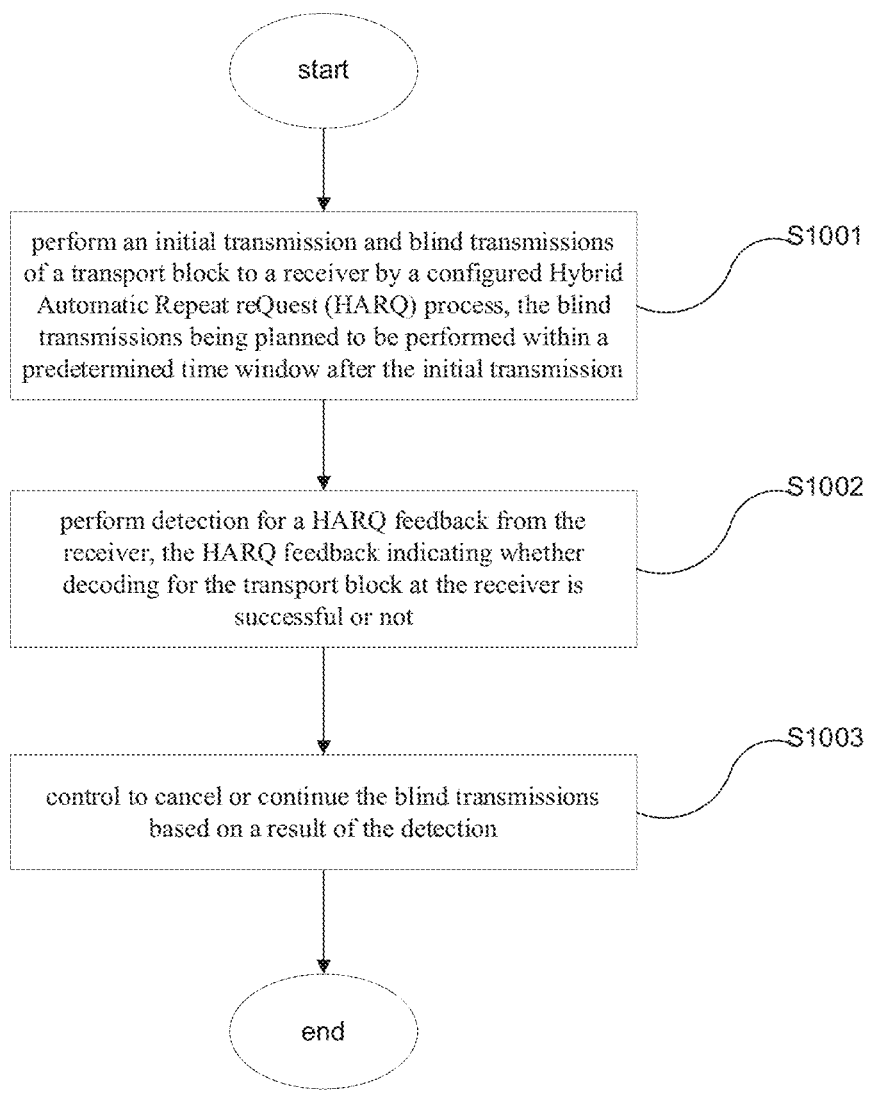

FIGS. 15A and 15B illustrate an electronic device for a transmitter and a communication method thereof according to the present disclosure, respectively. FIG. 15A shows a block diagram of an electronic device 1000 for a transmitter according to the present disclosure. Depending on specific communication scenarios, the electronic device 1000 may be implemented as a base station or a UE. The electronic device 1000 may perform data transmission with an electronic device 2000 which will be described below.

As shown in FIG. 15A, the electronic device 1000 includes a processing circuitry 1001, and the processing circuitry 1001 includes a data transmitting unit 1002, a HARQ feedback detecting unit 1003 and a transmission controlling unit 1004. The processing circuitry 1001 may be configured to perform the communication method as shown in FIG. 15B. The processing circuitry 1001 may refer to various implementations of a digital circuitry, an analog circuitry, or a circuitry for hybrid signal (a combination of analog signal and digital signal) that perform functions in a computing system. The processing circuitry may include, for example, a circuitry such as an integrated circuit (IC), an application specific integrated circuit (ASIC), a portion or circuit of an individual processor core, an entire processor core, an individual processor, a programmable hardware device such as a field programmable array (FPGA), and/or a system including multiple processors.

The data transmitting unit 1002 of the processing circuitry 1001 is configured to perform and initial transmission and blind transmission of a transport block to a receiver by a configured hybrid automatic repeat request (HARQ) process (i.e., perform step S1001 in FIG. 15B). The data transmitting unit 1002 may start a first timer (timer T2) after the completion of the initial transmission, and plan the blind transmissions within a predetermined time window after the initial transmission (step S1001). The initial transmission may be a new transmission or a HARQ retransmission of the transport block. Preferably, the initial transmissions and the blind transmissions do not exceed a predetermined maximum number of transmissions.

Optionally, the data transmitting unit 1002 may set different priorities for the initial transmission and the blind transmissions so that the priority of the blind transmissions is lower than that of the initial transmission.

Optionally, the data transmitting unit 1002 may allocate different frequency-domain resources for the initial transmission and the blind transmissions. Especially in the Sidelink communication scenario, the resource used for the initial transmission may be selected from a scheduling/sensing resource pool, while the resources used for the blind transmissions may be selected from a non-scheduling/sensing resource pool.

The HARQ feedback detecting unit 1003 of the processing circuitry 1001 is configured to perform detection for a HARQ feedback from the receiver (i.e., perform step S1002 in FIG. 15B). The HARQ feedback indicates whether decoding for the transport block at the receiver is successful or not.

The transmission controlling unit 1004 is configured to control to cancel or continue the blind transmissions (i.e., perform step S1003 in FIG. 15B) based on a result of the detection performed by the HARQ feedback detecting unit 1003. When the HARQ feedback detecting unit 1003 does not detect the HARQ feedback from the receiver, the transmission control unit 1004 may control the data transmitting unit 1002 to continue the blind transmissions within the predetermined time window, or when the HARQ feedback detecting unit 1003 detects the HARQ feedback, control the data transmitting unit 1002 to cancel the blind transmissions that have not been performed. Alternatively, the transmission controlling unit 1004 may control the data transmitting unit 1002 to cancel the blind transmissions that have not been performed when the HARQ feedback detecting unit 1003 detects ACK, or when the HARQ feedback detection unit 1003 detects NACK, control the data transmitting unit 1002 to continue the blind transmissions that have not been performed, and perform a HARQ retransmission of the transport block after a second timer (timer T1) started upon the completion of the initial transmission expires.

The electronic device 1000 may further include a communication unit 1005. The communication unit 1005 can be configured to communicate with the receiver (for example, the electronic device 2000 as described below) under control of the processing circuitry 1001. In one example, the communication unit 1005 can be implemented as a transceiver including communication components such as an antenna array and/or radio frequency link. The communication unit 1005 is depicted with a dotted line since it can also be located externally to the electronic device 1000.

The electronic device 1000 may further include a memory 1006. The memory 1006 can store various data and instructions, such as a program and data for operating the electronic device 1000, various data generated by the processing circuitry 1001, and the like. The memory 1006 is depicted in a dotted line since it may also be located within the processing circuitry 1001 or externally to the electronic device 1000. The memory 1006 may be a volatile memory and/or a non-volatile memory. For example, the memory 1006 may include, but is not limited to, a random access memory (RAM), a dynamic random access memory (DRAM), a static random access memory (SRAM), a read only memory (ROM) or a flash memory.

Figure 16A:
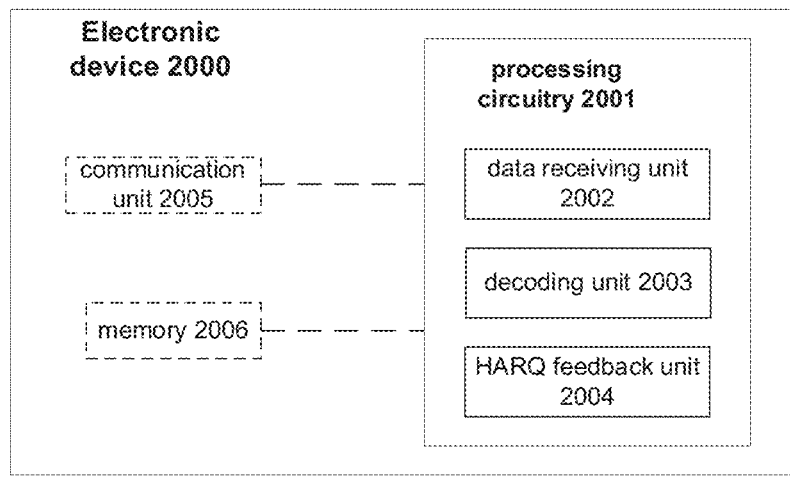
FIGS. 16A and 16B illustrate an electronic device for a receiver and a communication method thereof, respectively, according to the present disclosure.
Figure 16B:
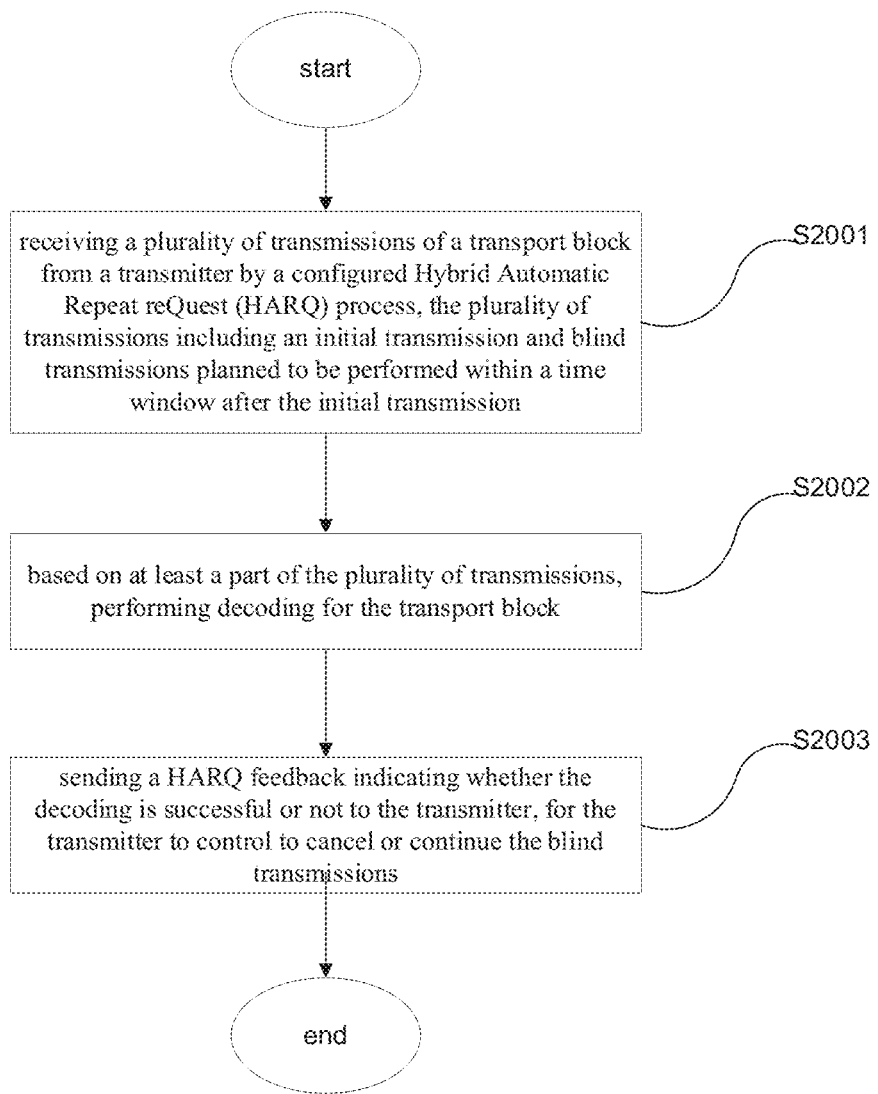

FIGS. 16A and 16B illustrate an electronic device for a receiver and a communication method thereof according to the present disclosure, respectively. FIG. 16A shows a block diagram of an electronic device 2000 for a receiver according to the present disclosure. Depending on specific communication scenarios, the electronic device 2000 may be implemented as a base station or a UE. The electronic device 2000 may perform data transmission with the electronic device 1000 which will be described above.

As shown in FIG. 16A, the electronic device 2000 includes a processing circuitry 2001, and the processing circuitry 2001 includes a data receiving unit 2002, a decoding unit 2003 and a HARQ feedback unit 2004. The processing circuitry 2001 may be configured to perform the communication method as shown in FIG. 16B. The processing circuitry 2001 may refer to various implementations of a digital circuitry, an analog circuitry, or a circuitry for hybrid signal (a combination of analog signal and digital signal) that perform functions in a computing system. The processing circuitry may include, for example, a circuitry such as an integrated circuit (IC), an application specific integrated circuit (ASIC), a portion or circuit of an individual processor core, an entire processor core, an individual processor, a programmable hardware device such as a field programmable array (FPGA), and/or a system including multiple processors.

The data receiving unit 2002 of the processing circuitry 2001 is configured to receive a plurality of transmissions of a transport block from the transmitter through a configured hybrid automatic repeat request (HARQ) process (i.e., perform step S2001 in FIG. 16B). The plurality of transmissions include an initial transmission and blind transmissions planned to be performed within a time window after the initial transmission. The data receiving unit 2002 may identify a type of each transmission by identifying relevant fields, such as NDI and HI, in control information associated with the transmission. Preferably, the initial transmission and the blind transmissions do not exceed a predetermined maximum number of transmissions.

Optionally, the data receiving unit 2002 may perform the reception based on a transmission priority, where the priority of the blind transmissions may be set to be lower than that of the initial transmission.

Optionally, the data receiving unit 2002 may receive the initial transmission and the blind transmissions on different frequency-domain resources. For example, in the Sidelink communication scenario, the resources used for receiving the initial transmission may be selected from a scheduling/sensing resource pool, while the resources used for receiving the blind transmissions may be selected from a non-scheduling/sensing resource pool.

The decoding unit 2003 is configured to perform decoding for the transport block based on at least a part of the plurality of transmissions (i.e., perform step S2002 in FIG. 16B). Each time the transport block is received, the decoding unit 2003 may soft-combine it with the previously received transport block to jointly decode it.

The HARQ feedback unit 2004 is configured to send a HARQ feedback indicating whether or not the decoding unit 2003 has decoded successfully to the transmitter (i.e., perform step S2003 in FIG. 16B). The HARQ feedback may be used by the transmitter to control cancellation or continuation of the blind transmissions. In one example, the HARQ feedback unit 2004 may send the HARQ feedback at a timing after expiration of a timer (T3) started from upon receiving the initial transmission or upon the first successful decoding. In another example, the HARQ feedback unit 2004 may send the HARQ feedback on a HARQ feedback resource corresponding to the initial transmission or on a HARQ feedback resource closest in time to the first successful decoding.

The electronic device 2000 may further include a communication unit 2005. The communication unit 2005 may be configured to perform the Sidelink communication with the transmitter (for example, the electronic device 1000 as described above) under the control of the processing circuitry 2001. In an example, the communication unit 2005 may be implemented as a transceiver, including communication components such as an antenna array and/or a radio frequency link. The communication unit 2005 is drawn with a dotted line because it can also be located outside the electronic device 2000.

The electronic device 2000 may further include a memory 2006. The memory 2006 can store various data and instructions, such as a program and data for operating the electronic device 2000, various data generated by the processing circuitry 2001, and the like. The memory 2006 is drawn with a dotted line because it can also be located in the processing circuitry 2001 or outside the electronic device 2000. The memory 2006 may be a volatile memory and/or a nonvolatile memory. For example, the memory 2006 may include, but is not limited to, a random access memory (RAM), a dynamic random access memory (DRAM), a static random access memory (SRAM), a read only memory (ROM) or a flash memory.

It should be understood that the various units of the electronic device 1000 and 2000 described in the above embodiments are only logical modules divided according to the specific functions they implement, and are not used to limit specific implementations. In the actual implementation, the foregoing units may be implemented as individual physical entities, or may also be implemented by a single entity (for example, a processor (CPU or DSP, etc.), an integrated circuit, etc.).

Exemplary Implementations of the Present Disclosure

According to the embodiments of the present disclosure, various implementations for practicing concepts of the present disclosure can be conceived, including but not limited to:

1. An electronic device for a transmitter, comprising a processing circuitry configured to: perform an initial transmission and blind transmissions of a transport block to a receiver by a configured Hybrid Automatic Repeat reQuest (HARQ) process, the blind transmissions being planned to be performed within a predetermined time window after the initial transmission; perform detection for a HARQ feedback from the receiver, the HARQ feedback indicating whether decoding for the transport block at the receiver is successful or not; and control to cancel or continue the blind transmissions based on a result of the detection.
2. The electronic device of 1, the processing circuitry is further configured to: select available transmission resources within the predetermined time window; and control to cancel or continue the blind transmissions based on a result of the resource selection and the result of the detection for the HARQ feedback.
3. The electronic device of 1 or 2, the processing circuitry is further configured to: in a case of detecting that the HARQ feedback is not received from the receiver, perform the blind transmissions of the transport block within the predetermined time window.
4. The electronic device of 1 or 2, the processing circuitry is further configured to: in a case of detecting that the HARQ feedback is received from the receiver, control to cancel blind transmissions that have not be performed within the predetermined time window.
5. The electronic device of 1 or 2, the processing circuitry is further configured to: in a case of detecting that the HARQ feedback indicating successful decoding is received, control to cancel blind transmissions that have not be performed within the predetermined time window.
6. The electronic device of 1 or 2, the processing circuitry is further configured to: in a case of detecting that the HARQ feedback indicating unsuccessful decoding is received, determine to perform a HARQ retransmission after a second timer started upon the initial transmission expires.
7. The electronic device of 6, the processing circuitry is further configured to: in a case of detecting that the HARQ feedback indicating unsuccessful decoding is received, control to continue blind transmissions that have not be performed within the predetermined time window.
8. The electronic device of 1 or 2, wherein the plurality of transmissions do not exceed a predetermined number of times, and wherein the processing circuitry is configured to notify the receiver of the predetermined number of times.
9. The electronic device of 1 or 2, wherein the initial transmission is a HARQ retransmission performed in response to decoding failure for the transport block that was transmitted previously.
10. The electronic device of 1 or 2, wherein the initial transmission has a priority higher than that of the blind transmissions.

11. The electronic device of 1 or 2, wherein the initial transmission and the blind transmissions are allocated with different frequency-domain transmission resources.

12. An electronic device for a receiver, comprising a processing circuitry configured to:
receive a plurality of transmissions of a transport block from a transmitter by a configured Hybrid Automatic Repeat reQuest (HARQ) process, the plurality of transmissions including an initial transmission and blind transmissions planned to be performed within a time window after the initial transmission; based on at least a part of the plurality of transmissions, perform decoding for the transport block; and send a HARQ feedback indicating whether the decoding is successful or not to the transmitter, for the transmitter to control to cancel or continue the blind transmissions.

13. The electronic device of 12, the processing circuitry is further configured to: start a first timer upon receiving the initial transmission or upon the first successful decoding for the transport block; and send the HARQ feedback at a timing after the first timer expires.

14. The electronic device of 12, the processing circuitry is further configured to: determine a HARQ feedback resource corresponding to the initial transmission of the transport block, and send the HARQ feedback on the HARQ feedback resource for the initial transmission; or determine a plurality of HARQ feedback resources corresponding to the plurality of transmissions of the transport block, and upon the first successful decoding for the transport block, select a HARQ feedback resource closet in time to the first successful decoding for sending the HARQ feedback.

15. The electronic device of any of 12-14, wherein the initial transmission is a HARQ retransmission performed in response to decoding failure for the transport block that was transmitted previously.

16. The electronic device of any of 12-14, wherein the initial transmission has a priority higher than that of the blind transmissions.

17. The electronic device of any of 12-14, wherein the initial transmission and the blind transmissions are allocated with different frequency domain transmission resources.

18. The electronic device of 13, wherein the performing decoding for the transport block comprises: in a case where the decoding for previously received transport block fails, perform the decoding by combining the transport block as currently received and the transport block as received previously, until the decoding succeeds or the first timer expires.

19. An electronic device for a transmitter, comprising a processing circuitry configured to: select, from a first resource pool for Sidelink communication, transmission resources for performing an initial transmission of a transport block to a receiver by a configured Hybrid Automatic Repeat reQuest (HARQ) process; and select, from a second resource pool for Sidelink communication, transmission resources for performing blind transmissions of the transport block to the receiver by the HARQ process, wherein the first resource pool is different from the second resource pool.

20. The electronic device of 19, wherein the first resource pool is a resource pool for Sidelink communications that are based on scheduling or sensing, and the second resource pool is a resource pool for Sidelink communications that are not based on scheduling or sensing.

21. The electronic device of 20, the processing circuitry is further configured to: plan the blind transmissions within a predetermined time window after the initial transmission; perform detection of a HARQ feedback from the receiver, the HARQ feedback indicates whether decoding for the transport block is successful or not; and control to cancel or continue the blind transmissions based on a result of the detection.

22. The electronic device of 20, the processing circuitry is further configured to: the transmission resources selected for the blind transmissions of the transport block are consecutive in time.

23. An electronic device for a receiver, comprising a processing circuitry configured to: receive continuously, via a Sidelink communication, an initial transmission and blind transmissions of a transport block from a transmitter by a configured Hybrid Automatic Repeat reQuest (HARQ) process, wherein transmission resources for receiving the initial transmission are from a second resource pool, and transmission resources for receiving the blind transmissions are from a second resource pool, and wherein the first resource pool is different from the second resource pool.

24. The electronic device of 23, the processing circuitry is further configured to: based on at least a part of the plurality of transmissions, perform decoding for the transport block; start a first timer upon receiving the initial transmission or upon the first successful decoding for the transport block; and based on a result of the decoding and at a timing after the first timer expires, send a HARQ feedback indicating whether the decoding is successful or not to the transmitter.

25. The electronic device of 23, the processing circuitry is further configured to: based on at least a part of the plurality of transmissions, perform decoding for the transport block; and based on a result of the decoding, send a HARQ feedback indicating whether the decoding is successful or not on a HARQ feedback resource for the initial transmission or on a HARQ feedback resource closest in time to the first successful decoding.

26. A communication method, comprising: performing an initial transmission and blind transmissions of a transport block to a receiver by a configured Hybrid Automatic Repeat reQuest (HARQ) process, the blind transmissions being planned to be performed within a predetermined time window after the initial transmission; performing detection for a HARQ feedback from the receiver, the HARQ feedback indicating whether decoding for the transport block at the receiver is successful or not; and controlling to cancel or continue the blind transmissions based on a result of the detection.

27. A communication method, comprising: receiving a plurality of transmissions of a transport block from a transmitter by a configured Hybrid Automatic Repeat reQuest (HARQ) process, the plurality of transmissions including an initial transmission and blind transmissions planned to be performed within a time window after the initial transmission; based on at least a part of the plurality of transmissions, performing decoding for the transport block; and sending a HARQ feedback indicating whether the decoding is successful or not to the transmitter, for the transmitter to control to cancel or continue the blind transmissions.

27. A communication method, comprising: selecting, from a first resource pool for Sidelink communication, transmission resources for performing an initial transmission of a transport block to a receiver by a configured Hybrid Automatic Repeat reQuest (HARQ) process; and selecting, from a second resource pool for Sidelink communication, transmission resources for performing blind transmissions of the transport block to the receiver by the HARQ process, wherein the first resource pool is different from the second resource pool.

29. A communication method, comprising: receiving continuously, via a Sidelink communication, an initial transmission and blind transmissions of a transport block from a transmitter by a configured Hybrid Automatic Repeat reQuest (HARQ) process, wherein transmission resources for receiving the initial transmission are from a second resource pool, and transmission resources for receiving the blind transmissions are from a second resource pool, and wherein the first resource pool is different from the second resource pool.

30. A non-transitory computer readable storage medium storing executable instructions which, when executed, perform the communication method according to any of 26-29.

Application Examples of the Present Disclosure

The technology of the present disclosure can be applied to various products.

For example, the electronic device 1000 and 2000 according to the embodiments of the present disclosure can be implemented as a variety of base stations or included in a variety of base stations, or can be implemented as a variety of user devices or included in a variety of user devices.

The communication method according to the embodiments of the present disclosure may be implemented by various base stations or user devices; the methods and operations according to the embodiments of the present disclosure may be embodied as computer-executable instructions, stored in a non-transitory computer-readable storage medium, and can be performed by various base stations or user devices to implement one or more of the above-mentioned functions.

The technology according to the embodiments of the present disclosure can be made into various computer program products, which can be used in various base stations or user devices to implement one or more of the above-mentioned functions.

The base stations mentioned in the present disclosure can be implemented as any type of base stations, preferably, such as the macro gNB or ng-eNB defined in the 3GPP 5G NR standard. A gNB may be a gNB that covers a cell smaller than a macro cell, such as a pico gNB, micro gNB, and home (femto) gNB. Instead, the base station may be implemented as any other types of base stations such as a NodeB, eNodeB and a base transceiver station (BTS). The base station may include a main body configured to control wireless communication, and one or more remote radio heads (RRH), a wireless relay, a drone control tower, a control unit in an automated factory or the like disposed in a different place from the main body.

The user device may be implemented as a mobile terminal such as a smartphone, a tablet personal computer (PC), a notebook PC, a portable game terminal, a portable/dongle type mobile router, and a digital camera apparatus, or an in-vehicle terminal such as a car navigation device. The terminal device may also be implemented as a terminal (that is also referred to as a machine type communication (MTC) terminal) that performs machine-to-machine (M2M) communication, a drone, a sensor or actuator in an automated factory or the like. Furthermore, the terminal device may be a wireless communication module (such as an integrated circuit module including a single die) mounted on each of the above terminals.

Examples of the base station and the user device in which the present disclosure can be applied will be described briefly below.

It should be understood that the term "base station" in the present disclosure has the full breadth of its usual meaning and includes at least a wireless communication station that is used as part of a wireless communication system or radio system for facilitating communication. Examples of base stations may be, for example but not limited to, the following: one or both of a base transceiver station (BTS) and a base station controller (BSC) in a GSM system, one or both of a radio network controller (RNC) and Node B in a 3G communication system, an eNB in an LTE and LTE-Advanced system, or a gNB and ng-eNB in the 5G communication system. In D2D, M2M, and V2V communication scenarios, a logical entity with control function for communication may also be referred to as a base station. In cognitive radio communication scenarios, a logical entity that plays a spectrum coordination role may also be referred to as a base station. In an automated factory, a logical entity providing the network control function may be referred to as a base station.

First Application Example of Base Station

Figure 17:
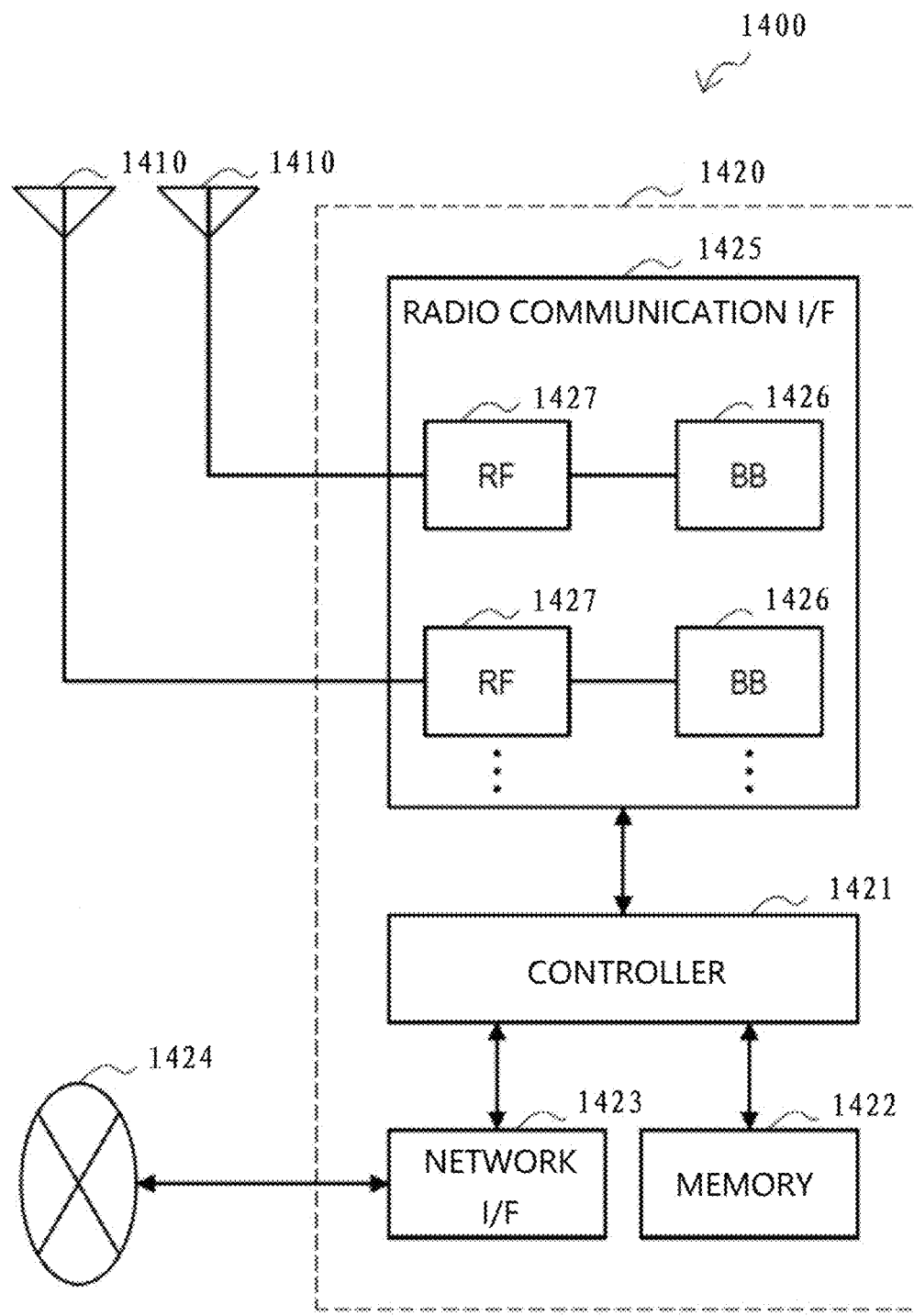
FIG. 17 illustrates a first example of schematic configuration of the base station according to the present disclosure.

FIG. 17 is a block diagram showing a first example of a schematic configuration of a base station to which the technology of the present disclosure can be applied. In FIG. 17, the base station is implemented as gNB 1400. The gNB 1400 includes a plurality of antennas 1410 and a base station device 1420. The base station device 1420 and each antenna 1410 may be connected to each other via an RF cable. In an implementation manner, the gNB 1400 (or the base station device 1420) herein may correspond to the above-mentioned electronic device 1000 or 2000.

The antennas 1410 includes multiple antenna elements, such as multiple antenna arrays for large-scale MIMO. The antennas 1410, for example, can be arranged into a matrix of antenna arrays, and are used by the base station device 1420 to transmit and receive wireless signals. For example, multiple antennas 1410 may be compatible with multiple frequency bands used by gNB 1400.

The base station device 1420 includes a controller 1421, a memory 1422, a network interface 1423, and a radio communication interface 1425.

The controller 1421 may be, for example, a CPU or a DSP, and operates various functions of the base station device 1420 at a higher layer. For example, the controller 1421 may include the processing circuitry 1001 or 2001 as described above, perform the communication method described in FIG. 15B or 16B, or control various components of the electronic device 1000 or 2000. For example, the controller 1421 generates data packets based on data in signals processed by the radio communication interface 1425, and passes the generated packets via the network interface 1423. The controller 1421 may bundle data from multiple baseband processors to generate bundled packets, and pass the generated bundled packets. The controller 1421 may have logical functions that perform controls such as radio resource control, radio bearer control, mobility management, admission control, and scheduling. The controls can be performed in conjunction with a nearby gNB or core network node. The memory 1422 includes a RAM and a ROM, and stores a program executed by the controller 1421 and various types of control data such as a terminal list, transmission power data, and scheduling data.

The network interface 1423 is a communication interface for connecting the base station device 1420 to the core network 1424. The controller 1421 may communicate with a core network node or another gNB via the network interface 1423. In this case, the gNB 1400 and the core network node or other gNBs may be connected to each other through a logical interface such as an S1 interface and an X2 interface. The network interface 1423 may also be a wired communication interface or a radio communication interface for a wireless backhaul line. If the network interface 1423 is a radio communication interface, compared with the frequency band used by the radio communication interface 1425, the network interface 1423 can use a higher frequency band for wireless communication.

The radio communication interface 1425 supports any cellular communication scheme such as 5G NR, and provides a wireless connection to a terminal located in a cell of the gNB 1400 via an antenna 1410. The radio communication interface 1425 may generally include, for example, a baseband (BB) processor 1426 and an RF circuit 1427. The BB processor 1426 may perform, for example, encoding/decoding, modulation/demodulation, and multiplexing/demultiplexing, and execute various types of signal processing in layers such as the physical layer, the MAC layer, the RLC layer, and the PDCP layer. As an alternative of the controller 1421, the BB processor 1426 may have a part or all of the above-mentioned logical functions. The BB processor 1426 may be a memory storing a communication control program, or a module including a processor and related circuits configured to execute the program. Updating the program can change the function of the BB processor 1426. The module may be a card or a blade inserted into a slot of the base station device 1420. Alternatively, the module may be a chip mounted on a card or a blade. Meanwhile, the RF circuit 1427 may include, for example, a mixer, a filter, and an amplifier, and transmits and receives a wireless signal via the antenna 1410. Although FIG. 16 illustrates an example in which one RF circuit 1427 is connected to one antenna 1410, the present disclosure is not limited to this illustration, but one RF circuit 1427 may be connected to multiple antennas 1410 at the same time.

As shown in FIG. 17, the radio communication interface 1425 may include a plurality of BB processors 1426. For example, the plurality of BB processors 1426 may be compatible with multiple frequency bands used by gNB 1400. As shown in FIG. 17, the radio communication interface 1425 may include a plurality of RF circuits 1427. For example, the plurality of RF circuits 1427 may be compatible with multiple antenna elements. Although FIG. 17 shows an example in which the radio communication interface 1425 includes a plurality of BB processors 1426 and a plurality of RF circuits 1427, the radio communication interface 1425 may also include a single BB processor 1426 or a single RF circuit 1427.

In the gNB 1400 illustrated in FIG. 17, one or more of the units included in the processing circuitry 1001 described with reference to FIG. 15A or the processing circuitry 2001 described with reference to FIG. 16A may be implemented in the radio communication interface 1425. Alternatively, at least a part of these components may be implemented in the controller 1421. As an example, the gNB 1400 includes a part (for example, the BB processor 1426) or the entire of the radio communication interface 1425 and/or a module including the controller 1421, and the one or more components may be implemented in the module. In this case, the module may store a program (in other words, a program causing the processor to execute operations of the one or more components) causing the processor to function as the one or more components, and execute the program. As another example, a program causing the processor to function as the one or more components may be installed in the gNB 1400, and the radio communication interface 1425 (for example, the BB processor 1426) and/or the controller 1421 may execute the program. As described above, as a device including the one or more components, the gNB 1400, the base station device 1420 or the module may be provided. In addition, a readable medium in which the program is recorded may be provided.

Second Application Example of Base Station

Figure 18:
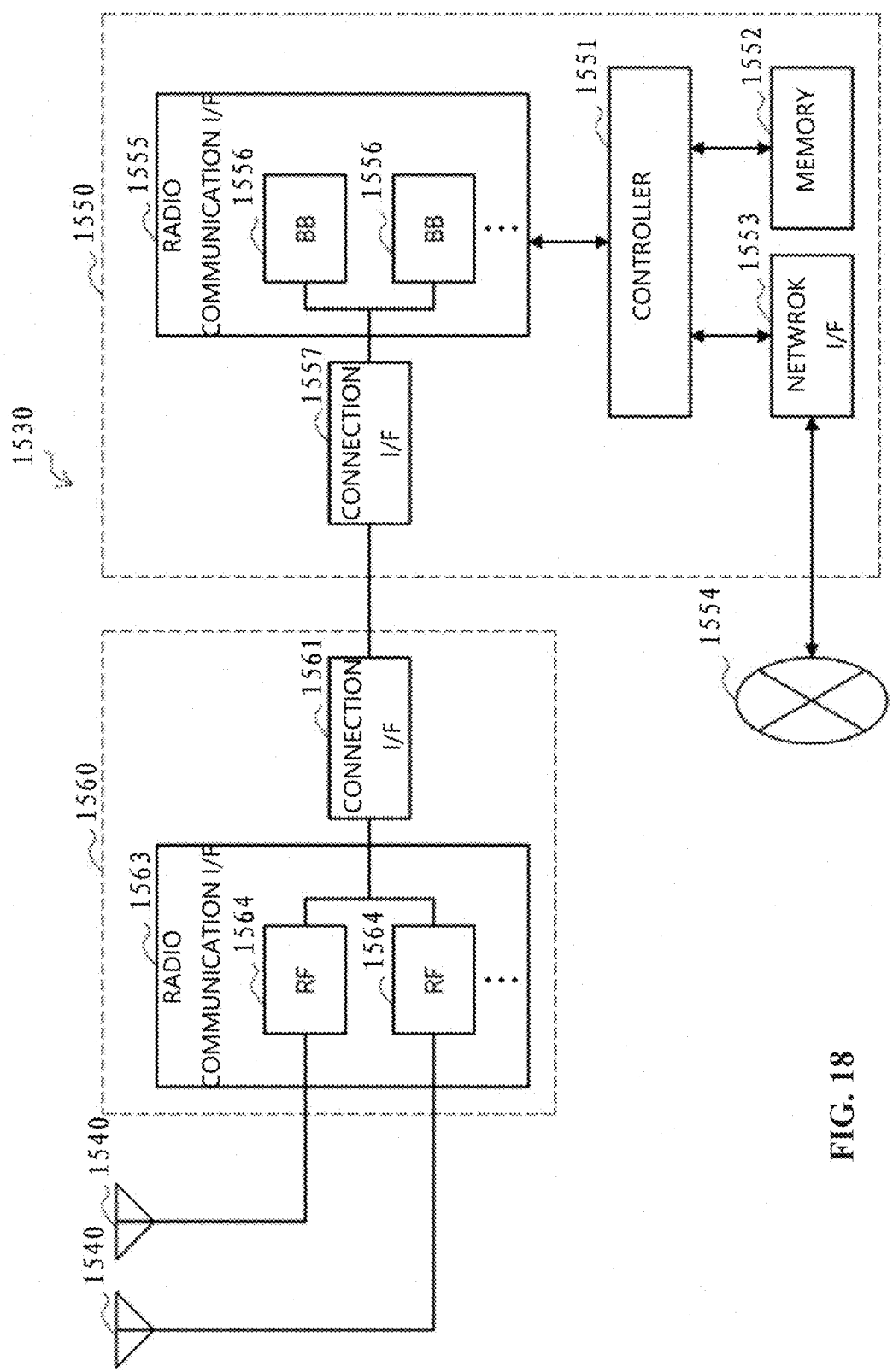
FIG. 18 illustrates a second example of schematic configuration of the base station according to the present disclosure.

FIG. 18 is a block diagram showing a second example of a schematic configuration of a base station to which the technology of the present disclosure can be applied. In FIG. 18, the base station is shown as gNB 1530. The gNB 1530 includes multiple antennas 1540, base station equipment 1550, and RRH 1560. The RRH 1560 and each antenna 1540 may be connected to each other via an RF cable. The base station equipment 1550 and the RRH 1560 may be connected to each other via a high-speed line such as a fiber optic cable. In an implementation manner, the gNB 1530 (or the base station device 1550) herein may correspond to the foregoing electronic device 1000 or 2000.

The antennas 1540 includes multiple antenna elements, such as multiple antenna arrays for large-scale MIMO. The antennas 1540, for example, can be arranged into a matrix of antenna arrays, and are used by the base station device 1550 to transmit and receive wireless signals. For example, multiple antennas 1540 may be compatible with multiple frequency bands used by gNB 1530.

The base station device 1550 includes a controller 1551, a memory 1552, a network interface 1553, a radio communication interface 1555, and a connection interface 1557. The controller 1551, the memory 1552, and the network interface 1553 are the same as the controller 1421, the memory 1422, and the network interface 1423 described with reference to FIG. 17.

The radio communication interface 1555 supports any cellular communication scheme such as 5G NR, and provides wireless communication to a terminal located in a sector corresponding to the RRH 1560 via the RRH 1560 and the antenna 1540. The radio communication interface 1555 may typically include, for example, a BB processor 1556. The BB processor 1556 is the same as the BB processor 1426 described with reference to FIG. 17 except that the BB processor 1556 is connected to the RF circuit 1564 of the RRH 1560 via the connection interface 1557. As shown in FIG. 18, the radio communication interface 1555 may include a plurality of BB processors 1556. For example, multiple BB processors 1556 may be compatible with multiple frequency bands used by gNB 1530. Although FIG. 18 shows an example in which the radio communication interface 1555 includes a plurality of BB processors 1556, the radio communication interface 1555 may also include a single BB processor 1556.

The connection interface 1557 is an interface for connecting the base station device 1550 (radio communication interface 1555) to the RRH 1560. The connection interface 1557 may also be a communication module for communication in the above-mentioned high-speed line connecting the base station device 1550 (radio communication interface 1555) to the RRH 1560.

The RRH 1560 includes a connection interface 1561 and a radio communication interface 1563.

The connection interface 1561 is an interface for connecting the RRH 1560 (radio communication interface 1563) to the base station device 1550. The connection interface 1561 may also be a communication module for communication in the above-mentioned high-speed line.

The radio communication interface 1563 transmits and receives wireless signals via the antenna 1540. The radio communication interface 1563 may generally include, for example, an RF circuit 1564. The RF circuit 1564 may include, for example, a mixer, a filter, and an amplifier, and transmits and receives wireless signals via the antenna 1540. Although FIG. 18 illustrates an example in which one RF circuit 1564 is connected to one antenna 1540, the present disclosure is not limited to this illustration, but one RF circuit 1564 may be connected to multiple antennas 1540 at the same time.

As shown in FIG. 18, the radio communication interface 1563 may include a plurality of RF circuits 1564. For example, the plurality of RF circuits 1564 may support multiple antenna elements. Although FIG. 18 shows an example in which the radio communication interface 1563 includes a plurality of RF circuits 1564, the radio communication interface 1563 may include a single RF circuit 1564.

In the gNB 1500 shown in FIG. 18, one or more units included in the processing circuitry 1001 described with reference to FIG. 15A or the processing circuitry 2001 described with reference to FIG. 16A may be implemented in the radio communication interface 1525. Alternatively, at least a part of these components may be implemented in the controller 1521. For example, the gNB 1500 includes a part (for example, the BB processor 1526) or the whole of the radio communication interface 1525, and/or a module including the controller 1521, and one or more components may be implemented in the module. In this case, the module may store a program for allowing the processor to function as one or more components (in other words, a program for allowing the processor to perform operations of one or more components), and may execute the program. As another example, a program for allowing the processor to function as one or more components may be installed in the gNB 1500, and the radio communication interface 1525 (for example, the BB processor 1526) and/or the controller 1521 may execute the program. As described above, as a device including one or more components, the gNB 1500, the base station device 1520, or a module may be provided, and a program for allowing the processor to function as one or more components may be provided. In addition, a readable medium in which the program is recorded may be provided.

First Application Example of User Device

Figure 19:
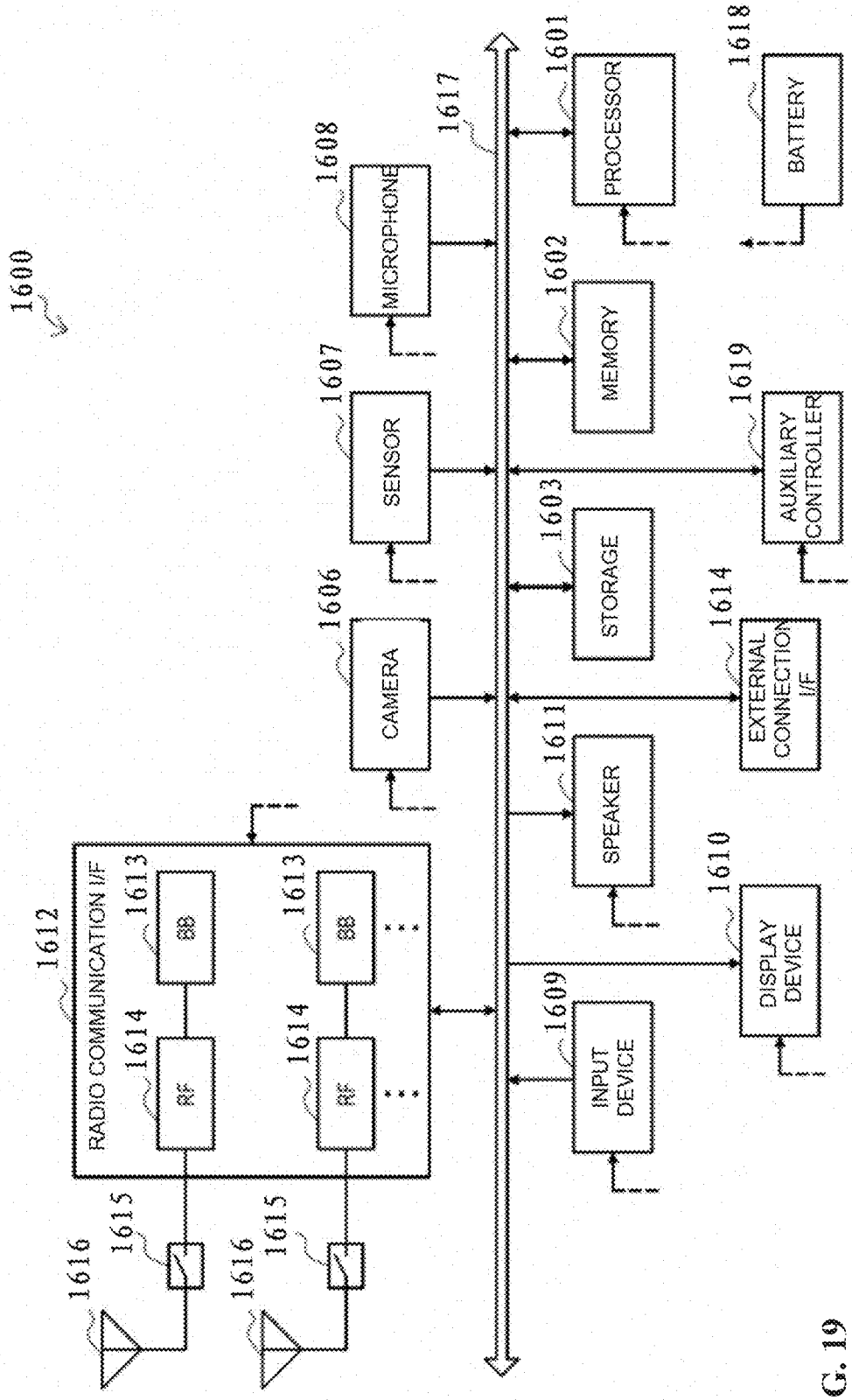
FIG. 19 illustrates an example of schematic configuration of a smart phone according to the present disclosure.

FIG. 19 is a block diagram showing an example of a schematic configuration of a smartphone 1600 to which the technology of the present disclosure can be applied. In an example, the smart phone 1600 may be implemented as the electronic device 1000 described with reference to FIG. 15A or the electronic device 2000 described with reference to FIG. 16A.

The smartphone 1600 includes a processor 1601, a memory 1602, a storage device 1603, an external connection interface 1604, a camera device 1606, a sensor 1607, a microphone 1608, an input device 1609, a display device 1610, a speaker 1611, a radio communication interface 1612, one or more antenna switches 1615, one or more antennas 1616, a bus 1617, a battery 1618, and an auxiliary controller 1619.

The processor 1601 may be, for example, a CPU or a system on chip (SoC), and controls functions of an application layer and another layer of the smartphone 1600. The processor 1601 may include or serve as the processing circuitry 1001 described with reference to FIG. 15A or the processing circuitry 2001 described with reference to 16A. The memory 1602 includes a RAM and a ROM, and stores data and programs executed by the processor 1601. The storage device 1603 may include a storage medium such as a semiconductor memory and a hard disk. The external connection interface 1604 is an interface for connecting external devices such as a memory card and a universal serial bus (USB) device to the smartphone 1600.

The camera device 1606 includes an image sensor such as a charge-coupled device (CCD) and a complementary metal oxide semiconductor (CMOS), and generates a captured image. The sensor 1607 may include a set of sensors such as a measurement sensor, a gyroscope sensor, a geomagnetic sensor, and an acceleration sensor. The microphone 1608 converts a sound input to the smartphone 1600 into an audio signal. The input device 1609 includes, for example, a touch sensor, a keypad, a keyboard, a button, or a switch configured to detect a touch on the screen of the display device 1610, and receives an operation or information input from a user. The display device 1610 includes a screen such as a liquid crystal display (LCD) and an organic light emitting diode (OLED) display, and displays an output image of the smartphone 1600. The speaker 1611 converts an audio signal output from the smartphone 1600 into a sound.

The radio communication interface 1612 supports any cellular communication scheme such as 4G LTE, 5G NR or the like, and performs wireless communication. The radio communication interface 1612 may generally include, for example, a BB processor 1613 and an RF circuit 1614. The BB processor 1613 may perform, for example, encoding/decoding, modulation/demodulation, and multiplexing/demultiplexing, and perform various types of signal processing for wireless communication. Meanwhile, the RF circuit 1614 may include, for example, a mixer, a filter, and an amplifier, and transmits and receives wireless signals via the antenna 1616. The radio communication interface 1612 may be a chip module on which a BB processor 1613 and an RF circuit 1614 are integrated. As shown in FIG. 19, the radio communication interface 1612 may include multiple BB processors 1613 and multiple RF circuits 1614. Although FIG. 19 illustrates an example in which the radio communication interface 1612 includes a plurality of BB processors 1613 and a plurality of RF circuits 1614, the radio communication interface 1612 may also include a single BB processor 1613 or a single RF circuit 1614.

In addition, in addition to the cellular communication scheme, the radio communication interface 1612 may support other types of wireless communication scheme, such as a short-range wireless communication scheme, a near field communication scheme, and a wireless local area network (LAN) scheme. In this case, the radio communication interface 1612 may include a BB processor 1613 and an RF circuit 1614 for each wireless communication scheme.

Each of the antenna switches 1615 switches a connection destination of the antenna 1616 between a plurality of circuits included in the radio communication interface 1612 (for example, circuits for different wireless communication schemes).

The antennas 1616 includes multiple antenna elements, such as multiple antenna arrays for large-scale MIMO. The antennas 1616, for example, can be arranged into a matrix of antenna arrays, and are used by the radio communication interface 1612 to transmit and receive wireless signals. The smart phone 1600 can includes one or more antenna panels (not shown).

In addition, the smartphone 1600 may include an antenna 1616 for each wireless communication scheme. In this case, the antenna switch 1615 may be omitted from the configuration of the smartphone 1600.

The bus 1617 connects the processor 1601, the memory 1602, the storage device 1603, the external connection interface 1604, the camera device 1606, the sensor 1607, the microphone 1608, the input device 1609, the display device 1610, the speaker 1611, the radio communication interface 1612, and the auxiliary controller 1619 to each other. The battery 1618 supplies power to each block of the smartphone 1600 shown in FIG. 19 via a feeder, and the feeder is partially shown as a dotted line in the figure. The auxiliary controller 1619 operates the minimum necessary functions of the smartphone 1600 in the sleep mode, for example.

In the smart phone 1600 shown in FIG. 19, one or more components included in the processing circuitry may be implemented in the radio communication interface 1612. Alternatively, at least a part of these components may be implemented in the processor 1601 or the auxiliary controller 1619. As an example, the smart phone 1600 includes a part (for example, the BB processor 1613) or the whole of the radio communication interface 1612, and/or a module including the processor 1601 and/or the auxiliary controller 1619, and one or more components may be Implemented in this module. In this case, the module may store a program that allows processing to function as one or more components (in other words, a program for allowing the processor to perform operations of one or more components), and may execute the program. As another example, a program for allowing the processor to function as one or more components may be installed in the smart phone 1600, and the radio communication interface 1612 (for example, the BB processor 1613), the processor 1601, and/or the auxiliary The controller 1619 can execute this program. As described above, as a device including one or more components, a smart phone 1600 or a module may be provided, and a program for allowing a processor to function as one or more components may be provided. In addition, a readable medium in which the program is recorded may be provided.

Second Application Example of User Device

Figure 20:
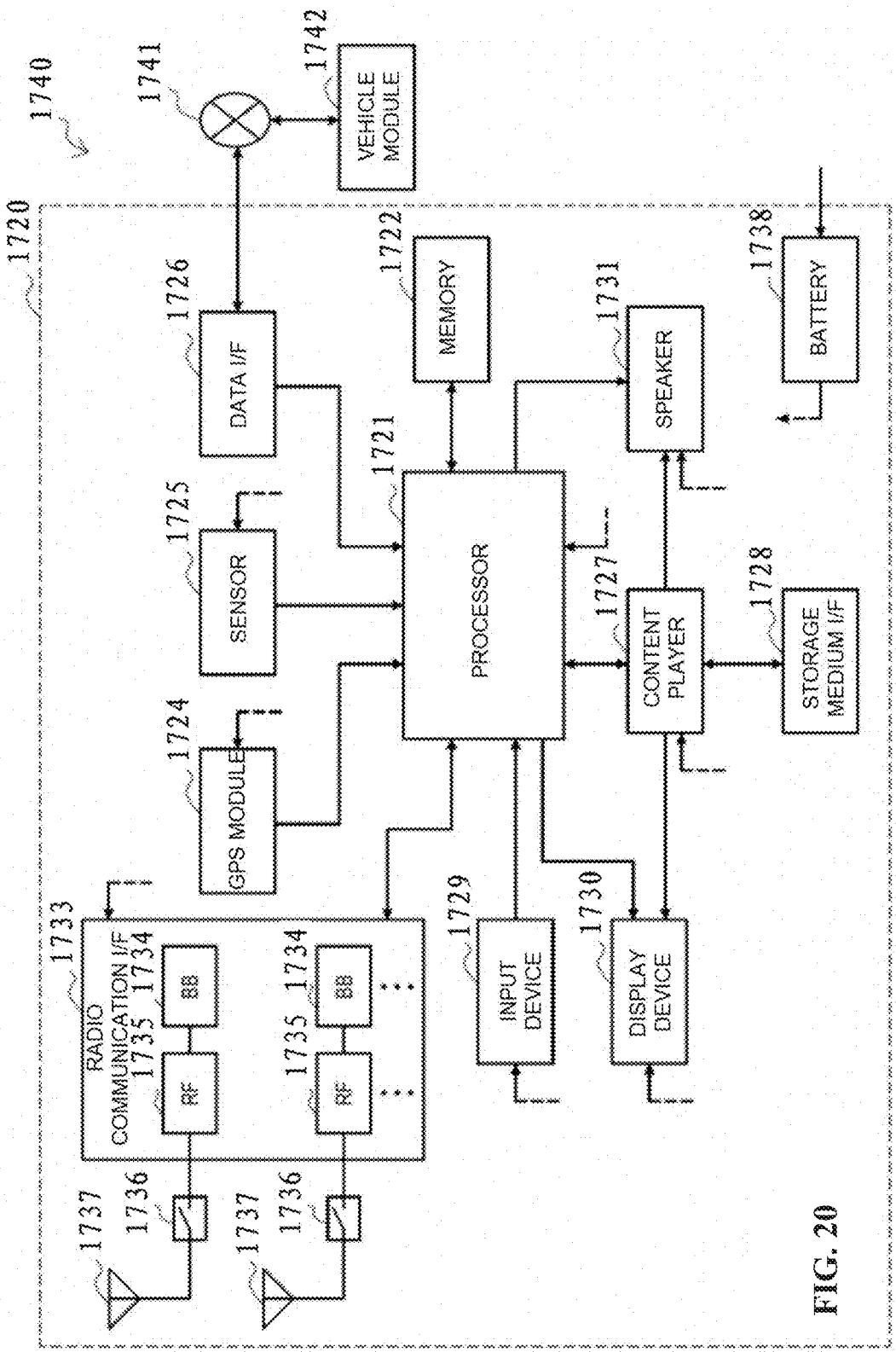
FIG. 20 illustrates an example of schematic configuration of an automobile navigation device according to the present disclosure.

FIG. 20 is a block diagram showing an example of a schematic configuration of a car navigation device 1720 to which the technology of the present disclosure can be applied. The car navigation device 1720 may be implemented as the electronic device 1000 described with reference to FIG. 15A or the electronic device 2000 described with reference to FIG. 16A. The car navigation device 1720 includes a processor 1721, a memory 1722, a global positioning system (GPS) module 1724, a sensor 1725, a data interface 1726, a content player 1727, a storage medium interface 1728, an input device 1729, a display device 1730, a speaker 1731, and a radio communication interface 1733, one or more antenna switches 1736, one or more antennas 1737, and a battery 1738. In one example, the car navigation device 1720 may be implemented as the UE as described in the present disclosure.

The processor 1721 may be, for example, a CPU or a SoC, and controls navigation functions and other functions of the car navigation device 1720. The memory 1722 includes a RAM and a ROM, and stores data and programs executed by the processor 1721.

The GPS module 1724 uses a GPS signal received from a GPS satellite to measure the position (such as latitude, longitude, and altitude) of the car navigation device 1720. The sensor 1725 may include a set of sensors such as a gyroscope sensor, a geomagnetic sensor, and an air pressure sensor. The data interface 1726 is connected to, for example, an in-vehicle network 1741 via a terminal not shown, and acquires data (such as vehicle speed data) generated by the vehicle.

The content player 1727 reproduces content stored in a storage medium such as a CD and a DVD, which is inserted into the storage medium interface 1728. The input device 1729 includes, for example, a touch sensor, a button, or a switch configured to detect a touch on the screen of the display device 1730, and receives an operation or information input from a user. The display device 1730 includes a screen such as an LCD or OLED display, and displays an image of a navigation function or reproduced content. The speaker 1731 outputs the sound of the navigation function or the reproduced content.

The radio communication interface 1733 supports any cellular communication scheme such as 4G LTE or 5G NR, and performs wireless communication. The radio communication interface 1733 may generally include, for example, a BB processor 1734 and an RF circuit 1735. The BB processor 1734 may perform, for example, encoding/decoding, modulation/demodulation, and multiplexing/demultiplexing, and perform various types of signal processing for wireless communication. Meanwhile, the RF circuit 1735 may include, for example, a mixer, a filter, and an amplifier, and transmit and receive wireless signals via the antenna 1737. The radio communication interface 1733 may also be a chip module on which a BB processor 1734 and an RF circuit 1735 are integrated. As shown in FIG. 20, the radio communication interface 1733 may include a plurality of BB processors 1734 and a plurality of RF circuits 1735. Although FIG. 20 shows an example in which the radio communication interface 1733 includes a plurality of BB processors 1734 and a plurality of RF circuits 1735, the radio communication interface 1733 may also include a single BB processor 1734 or a single RF circuit 1735.

In addition, in addition to the cellular communication scheme, the radio communication interface 1733 may support other types of wireless communication scheme, such as a short-range wireless communication scheme, a near field communication scheme, and a wireless LAN scheme. In this case, the radio communication interface 1733 may include a BB processor 1734 and an RF circuit 1735 for each wireless communication scheme.

Each of the antenna switches 1736 switches the connection destination of the antenna 1737 between a plurality of circuits included in the radio communication interface 1733, such as circuits for different wireless communication schemes.

The antennas 1737 includes multiple antenna elements, such as multiple antenna arrays for large-scale MIMO. The antennas 1737, for example, can be arranged into a matrix of antenna arrays, and are used by the radio communication interface 1733 to transmit and receive wireless signals.

In addition, the car navigation device 1720 may include an antenna 1737 for each wireless communication scheme. In this case, the antenna switch 1736 may be omitted from the configuration of the car navigation device 1720.

The battery 1738 supplies power to each block of the car navigation device 1720 shown in FIG. 20 via a feeder, and the feeder is partially shown as a dotted line in the figure. The battery 1738 accumulates power provided from the vehicle.

In the car navigation device 1720 shown in FIG. 20, one or more components included in the processing circuitry can be implemented in the radio communication interface 1733. Alternatively, at least a part of these components may be implemented in the processor 1721. As an example, the car navigation device 1720 includes a part (for example, the BB processor 1734) or the whole of the radio communication interface 1733, and/or a module including the processor 1721, and one or more components may be implemented in the module. In this case, the module may store a program that allows processing to function as one or more components (in other words, a program for allowing the processor to perform operations of one or more components), and may execute the program. As another example, a program for allowing the processor to function as one or more components may be installed in the car navigation device 1720, and the radio communication interface 1733 (for example, the BB processor 1734) and/or the processor 1721 may Execute the procedure. As described above, as a device including one or more components, a car navigation device 1720 or a module may be provided, and a program for allowing the processor to function as one or more components may be provided. In addition, a readable medium in which the program is recorded may be provided.

The technology of the present disclosure may also be implemented as an in-vehicle system (or vehicle) 1740 including one or more of a car navigation device 1720, an in-vehicle network 1741, and a vehicle module 1742. The vehicle module 1742 generates vehicle data such as vehicle speed, engine speed, and failure information, and outputs the generated data to the in-vehicle network 1741.

Although the illustrative embodiments of the present disclosure have been described with reference to the accompanying drawings, the present disclosure is certainly not limited to the above examples. Those skilled in the art may achieve various adaptions and modifications within the scope of the appended claims, and it will be appreciated that these adaptions and modifications certainly fall into the scope of the technology of the present disclosure.

For example, in the above embodiments, the multiple functions included in one module may be implemented by separate means. Alternatively, in the above embodiments, the multiple functions included in multiple modules may be implemented by separate means, respectively. In additions, one of the above functions may be implemented by multiple modules. Needless to say, such configurations are included in the scope of the technology of the present disclosure.

In this specification, the steps described in the flowcharts include not only the processes performed sequentially in chronological order, but also the processes performed in parallel or separately but not necessarily performed in chronological order. Furthermore, even in the steps performed in chronological order, needless to say, the order may be changed appropriately.

Although the present disclosure and its advantages have been described in detail, it will be appreciated that various changes, replacements and transformations may be made without departing from the spirit and scope of the present disclosure as defined by the appended claims. In addition, the terms "include", "comprise" or any other variants of the embodiments of the present disclosure are intended to be non-exclusive inclusion, such that the process, method, article or device including a series of elements includes not only these elements, but also those that are not listed specifically, or those that are inherent to the process, method, article or device. In case of further limitations, the element defined by the sentence "include one" does not exclude the presence of additional same elements in the process, method, article or device including this element.

What is claimed is:

1. An electronic device for a transmitter, comprising:
a processing circuitry configured to:
perform an initial transmission of a transport block followed by a predetermined first number of blind transmissions of the transport block to a receiver by a configured Hybrid Automatic Repeat reQuest (HARQ) process, the predetermined first number of blind transmissions scheduled to be performed within a predetermined time window that starts upon completion of the initial transmission of the transport block, the predetermined first number having been notified to the receiver;
perform detection for a HARQ feedback from the receiver within a second predetermined time window that starts upon completion of the initial transmission of the transport block and that has an end time that is later than an end time of the predetermined time window, the HARQ feedback indicating whether decoding for the transport block at the receiver is successful or not;
at least one of:
a) based on the HARO feedback being detected within the second predetermined time window and indicating unsuccessful decoding by the receiver:
perform control to continue any of the predetermined first number of blind transmissions that have not yet been performed within the predetermined time window. and
based on the HARQ feedback not being detected after the predetermined time window and within the second predetermined time window, perform a HARQ retransmission of the transport block followed by a predetermined second number of blind transmissions of the transport block, the predetermined second number of blind transmissions scheduled to be performed within a third predetermined time window that starts upon completion of the HARQ retransmission of the transport block, the predetermined second number having been notified to the receiver, or
b) based on the HARQ feedback not being detected within the second predetermined time window;
perform the HARQ retransmission of the transport block followed by the predetermined second number of blind transmissions of the transport block, the predetermined second number of blind transmissions scheduled to be performed within the third predetermined time window that starts upon completion of the HARQ retransmission of the transport block, the predetermined second number having been notified to the receiver;
perform a second detection for the HARQ feedback from the receiver within a fourth predetermined time window that starts upon completion of the HARQ retransmission of the transport block and that has an end time that is later than an end time of the third predetermined time window, the HARQ feedback indicating whether decoding for the HARQ retransmission of the transport block at the receiver is successful or not; and based on the HARQ feedback being detected within the fourth predetermined time window and indicating successful decoding by the receiver, perform control to cancel any of the predetermined second number of blind transmissions that have not yet been performed within the third predetermined time window.

2. The electronic device of claim 1, wherein the initial transmission of the transport block and the HARO retransmission of the transport block have a priority higher than any of the predetermined first or second number of blind transmissions, respectively.

3. The electronic device of claim 1, wherein the initial transmission of the transport block and the HARQ retransmission of the transport block are allocated with different frequency-domain transmission resources than the predetermined first and second number of blind transmissions, respectively.

4. A method performed by an electronic device for a transmitter, the method comprising:

performing an initial transmission of a transport block followed by a predetermined first number of blind transmissions of the transport block to a receiver by a configured Hybrid Automatic Repeat reQuest (HARQ) process, the predetermined first number of blind transmissions scheduled to be performed within a predetermined time window that starts upon completion of the initial transmission of the transport block, the predetermined first number having been notified to the receiver;

performing detection for a HARQ feedback from the receiver within a second predetermined time window that starts upon completion of the initial transmission of the transport block and that has an end time that is later than an end time of the predetermined time window, the HARQ feedback indicating whether decoding for the transport block at the receiver is successful or not;

at least one of:

a) based on the HARQ feedback being detected within the second predetermined time window and indicating unsuccessful decoding by the receiver:

performing control to continue any of the predetermined first number of blind transmissions that have not yet been performed within the predetermined time window, and based on the HARQ feedback not being detected after the predetermined time window and within the second predetermined time window, performing a HARQ retransmission of the transport block followed by a predetermined second number of blind transmissions of the transport block, the predetermined second number of blind transmissions scheduled to be performed within a third predetermined time window that starts upon completion of the HARQ retransmission of the transport block, the predetermined second number having been notified to the receiver, or b) based on the HARQ feedback not being detected within the second predetermined time window:

performing the HARQ retransmission of the transport block followed by the predetermined second number of blind transmissions of the transport block, the predetermined second number of blind transmissions scheduled to be performed within the third predetermined time window that starts upon completion of the HARQ retransmission of the transport block, the predetermined second number having been notified to the receiver;

performing a second detection for the HARQ feedback from the receiver within a fourth predetermined time window that starts upon completion of the HARQ retransmission of the transport block and that has an end time that is later than an end time of the third predetermined time window, the HARQ feedback indicating whether decoding for the HARQ retransmission of the transport block at the receiver is successful or not; and based on the HARQ feedback being detected within the fourth predetermined time window and indicating successful decoding by the receiver, performing control to cancel all of the blind transmissions that have not yet been performed within the third predetermined time window.

5. A non-transitory computer product containing instructions for a method performed by an electronic device for a transmitter, the method comprising:

performing an initial transmission of a transport block followed by a predetermined first number of blind transmissions of the transport block to a receiver by a configured Hybrid Automatic Repeat reQuest (HARQ) process, the predetermined first number of blind transmissions scheduled to be performed within a predetermined time window that starts upon completion of the initial transmission of the transport block, the predetermined first number having been notified to the receiver;

performing detection for a HARQ feedback from the receiver within a second predetermined time window that starts upon completion of the initial transmission of the transport block and that has an end time that is later than an end time of the predetermined time window, the HARQ feedback indicating whether decoding for the transport block at the receiver is successful or not;

at least one of:

a) based on the HARQ feedback being detected within the second predetermined time window and indicating unsuccessful decoding by the receiver:

performing control to continue any of the predetermined first number of blind transmissions that have not yet been performed within the predetermined time window, and based on the HARQ feedback not being detected after the predetermined time window and within the second predetermined time window, performing a HARQ retransmission of the transport block followed by a predetermined second number of blind transmissions of the transport block, the predetermined second number of blind transmissions scheduled to be performed within a third predetermined time window that starts upon completion of the HARQ retransmission of the transport block, the predetermined second number having been notified to the receiver, or b) based on the HARQ feedback not being detected within the second predetermined time window:

performing the HARQ retransmission of the transport block followed by the predetermined second number of blind transmissions of the transport block, the predetermined second number of blind transmissions scheduled to be performed within the third predetermined time window that starts upon completion of the HARQ retransmission of the transport block, the predetermined second number having been notified to the receiver;

performing a second detection for the HARQ feedback from the receiver within a fourth predetermined time window that starts upon completion of the HARQ retransmission of the transport block and that has an end time that is later than an end time of the third predetermined time window, the HARQ feedback indicating whether decoding for the HARQ retransmission of the transport block at the receiver is successful or not; and based on the HARQ feedback being detected within the fourth predetermined time window and indicating successful decoding by the receiver, performing control to cancel all of the blind transmissions that have not yet been performed within the third predetermined time window.

\* \* \* \* \*